United States Patent
Minovitch

(10) Patent No.: US 6,739,137 B2
(45) Date of Patent: May 25, 2004

(54) MAGNETIC CONDENSING SYSTEM FOR CRYOGENIC ENGINES

(76) Inventor: Michael Andrew Minovitch, 2832 St. George St., #6, Los Angeles, CA (US) 90027

( * ) Notice: Subject to any disclaimer, the term of this patent is extended or adjusted under 35 U.S.C. 154(b) by 0 days.

(21) Appl. No.: 10/151,537

(22) Filed: May 21, 2002

(65) Prior Publication Data

US 2003/0218852 A1 Nov. 27, 2003

(51) Int. Cl.⁷ .............................................. F25B 21/00
(52) U.S. Cl. ........................................... 62/3.1; 62/467
(58) Field of Search ............................ 62/3.1, 467, 51.1

(56) References Cited

U.S. PATENT DOCUMENTS

| | | | | |
|---|---|---|---|---|
| 3,819,299 A | * | 6/1974 | Brown | 417/52 |
| 4,107,935 A | * | 8/1978 | Steyert, Jr. | 62/3.1 |
| 4,366,857 A | * | 1/1983 | Mayer | 165/104.23 |
| 4,970,866 A | * | 11/1990 | Mokadam | 62/3.1 |
| 5,040,373 A | * | 8/1991 | Minovitch | 62/51.1 |
| 5,714,829 A | * | 2/1998 | Guruprasad | 310/306 |

* cited by examiner

Primary Examiner—William C. Doerrler
(74) Attorney, Agent, or Firm—Christie, Parker & Hale, LLP

(57) ABSTRACT

A method and apparatus is provided for generating an artificial heat sink below ambient temperature for a cryogenic condenser by isothermally magnetizing a paramagnetic fluid and removing the magnetic field thereby creating a temperature drop in the fluid by the magentocaloric effect. The heat of magnetization is converted into mechanical work by initially placing the fluid inside a sealed chamber with a door that opens to a conduit leading into the bore of a superconducting solenoid. When the solenoid is energized with current, it creates a strong axial magnetic field that exerts magnetic attractive forces on the fluid inside the chamber. When the fluid is released by opening the door, it is accelerated through the conduit toward the superconducting solenoid where it becomes magnetized by the increasing strength of the magnetic field. By mounting a non-magnetic turbine inside the conduit between the solenoid and the chamber, the kinetic energy of the accelerating flow stream, which is equal to the heat of magnetization, is converted into mechanical work thereby achieving isothermal magnetization. By removing the magnetic field after the fluid enters the bore of the solenoid, a temperature reduction is achieved thereby enabling the fluid to absorb heat in a cryogenic condenser.

39 Claims, 5 Drawing Sheets

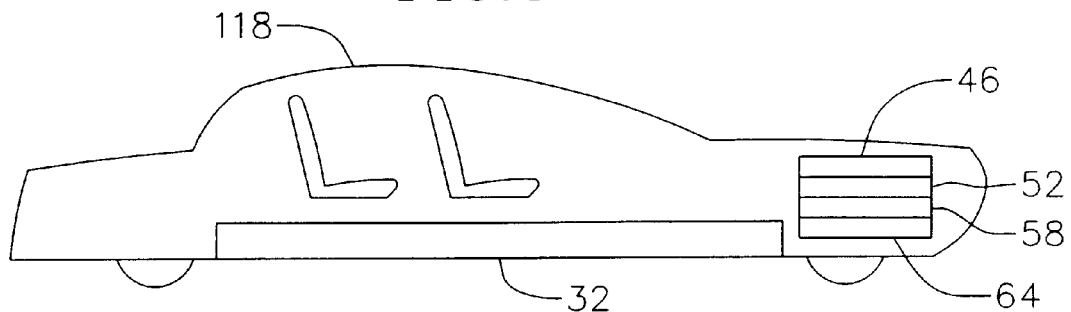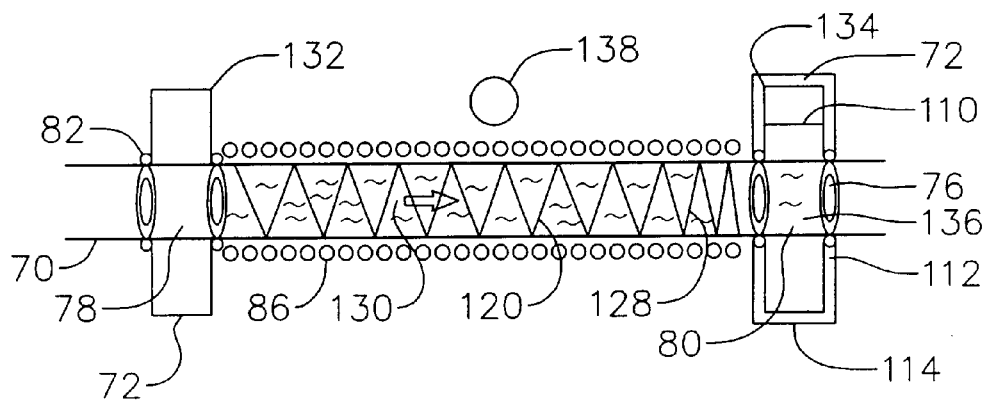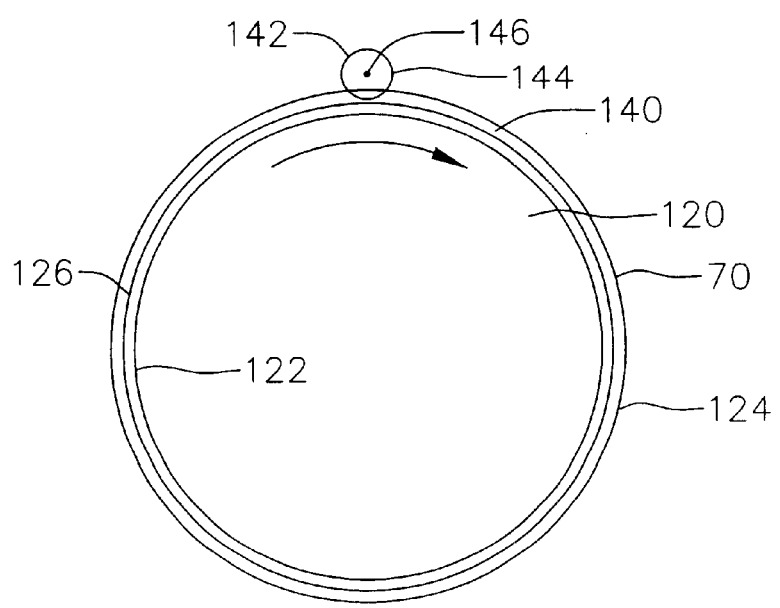

MAGNETIC CONDENSING SYSTEM FOR CRYOGENIC ENGINES

BACKGROUND

For hundreds of years engineers and scientists have recognized that the ambient thermal energy of the natural environment that is heated by the sun contains essentially unlimited amounts of free thermal energy. Unfortunately, all prior attempts to harness this natural heat energy and convert it into mechanical work with high power densities by a closed cycle condensing heat engine utilizing the natural environment as its high temperature heat reservoir have failed. As a result of all of these unsuccessful attempts, thermodynamicists have concluded that such engines are impossible. In fact, thermodynamicists are so convinced that such engines are impossible, they have categorically labeled them as "perpetual motion machines of the second kind." It is important to point out however, that this negative conclusion is not based on any fundamental physical law of nature but rather on the unsuccessful attempts to construct such engines. Although the "second law of thermodynamics" is usually cited as the basic reason why such engines are believed to be impossible, the second law itself is based on unprovable "postulates" laid down by Kelvin, Clausius and Planck over a century ago when the principle of conservation of mass and energy was accepted without question. (See *Thermodynamics*, Charles E. Merrill Publishing Co., Columbus, Ohio, pages 147–153 by Joachim E. Lay.) The Kelvin-Planck statement of the second law of thermodynamics is: "It is impossible to construct an engine which, operating in a cycle, will produce no other effect than the extraction of heat from a single heat reservoir and the performance of an equivalent amount of work."

By designing a cyclic heat engine that falls outside the operating conditions of the second law of thermodynamics (the premise) it is possible to harness the natural thermal energy of the environment at ambient temperature and convert a portion of it into useful mechanical work. One such heat engine is a simple toy called the "drinking bird" that can be found in almost any novelty shop. Although this engine is a closed cycle condensing heat engine and uses the ambient environment as its high temperature heat reservoir, it operates by generating an artificial low temperature heat reservoir by evaporating water. Hence, it does not operate according to the prescribed conditions of the Kelvin—Planck statement of the second law of thermodynamics and therefore cannot violate this law.

The basic thermodynamic operating principles of the drinking bird engine were analyzed by Carl Bachhuber in his paper, Energy From the Evaporation Of Water, *American Journal of Physics*, Vol. 51, No. 3, March 1983, pp. 259–264. In particular, Bachhuber has shown that ordinary water can be used to extract an unlimited amount of natural thermal energy from the surrounding environment and convert it into mechanical work. Moreover, the specific energy of the water that can be converted into useful mechanical work by this engine is approximately twice the specific energy available in automotive storage batteries. In a technical report issued by the Rand Corporation in August 1966, entitled *A Simple Heat Engine of Possible Utility in Primitive Environments*, Rand Corporation Publication No. P-3367, Richard Murrow proposed constructing larger versions of this engine for pumping water from the Nile river. A scaled up model of the basic drinking bird engine was constructed to a height of seven feet and found to be able to extract a considerable amount of natural heat energy from the ambient environment and convert it directly into mechanical work. In particular, the engine would be capable of extracting an unlimited amount of natural heat energy and convert it into an unlimited amount of mechanical work. (See, "The Research Frontier-Where is Science Taking Us," *Saturday Review*, Vol. 50, Jun. 3, 1967, pp. 51–55, by Richard Murrow.) Obviously, engines such as these which operate by converting the natural heat energy of the environment at ambient temperature into an unlimited amount of mechanical work are not "perpetual motion machines." In principle, larger engines of this type could be used to propel ocean going vessels indefinitely using ordinary sea water for generating an unlimited amount of mechanical work. Although this possibility is generally believed to be thermodynamically impossible, it is clearly not impossible. The existence of these engines proves that it is indeed possible to convert the natural heat energy of the environment at ambient temperature into an unlimited amount of mechanical work by creating an artificial low temperature heat reservoir below ambient. What has to be emphasized here regarding the possibility of violating the second law of thermodynamics is the creation of an artificial low temperature heat reservoir. If any cyclic heat engine produces such a low temperature heat reservoir while it operates it is, "strictly speaking," operating outside the domain of the second law and therefore, cannot logically be subject to this law. However, this is a moot point because the second law of thermodynamics is not really a fundamental law of physics as pointed out in the book cited above. However, it should also be emphasized that the present invention is not a heat engine, it is a condensing system.

In order to better understand the basic operating principles of the invention and its distinguishing operating characteristics that make it uniquely different from anything it the prior art, it will be useful to review the fundamental operating principles of prior art condensing heat engines, and, in particular, the operating principles of their condensing systems.

Prior art condensing heat engines such as the steam engine operate by compressing liquefied working fluid (such as water in the case of steam engines) to high pressure by a hydraulic compressor and feeding it into a boiler maintained at high temperature by burning fuel. Since a liquid is nearly incompressible and has very low specific volume, the amount of mechanical work consumed in compressing the liquefied working fluid is relatively low. When the compressed fluid is circulated through the boiler it is heated and vaporizes to high pressure gas (steam). This results in a several hundred fold increase in its specific volume. This high pressure gas is then fed into an expander which converts a portion of the heat absorbed in the boiler into mechanical work which is usually used for turning an electric generator. Since the specific volume of the high pressure gas expanding through the expander is many times greater than the specific volume of liquid, the mechanical work generated by the expander is many times greater than the mechanical work consumed by the compressor. After leaving the expander as low temperature vapor, this vapor is fed into a condenser where it is re-liquefied by utilizing the natural environment as a low temperature heat sink to extract the heat of vaporization. After the liquefied working fluid is discharged from the condenser it is recompressed and the cycle is repeated. The condenser is therefore just as important as the boiler because it reduces the specific volume of the working fluid so that the work consumed in recompressing it is a small fraction of the mechanical work generated by expanding it.

The most efficient cooling system (i.e., refrigerator) is known as a "Carnot refrigerator." The amount of mechanical work W required to transfer a quantity of heat Q from a low temperature $T_L$ to a high temperature $T_H$ is given by $$W = Q\left(\frac{T_H - T_L}{T_L}\right)$$

The natural environment at ambient temperature plays a key role in the design of condensing heat engines and refrigerators. It represents a temperature zone which divides the operating temperature regimes of cyclic heat engines and refrigerators. This is because the environment at ambient temperature represents the low temperature heat reservoir for condensing heat engines which operate by absorbing heat energy from a high temperature reservoir above ambient temperature and generating mechanical work, while in refrigerators the natural environment represents the high temperature heat reservoir which operate by absorbing heat energy from a low temperature reservoir below ambient temperature, transferring it to the high temperature heat reservoir, and consuming mechanical work.

The reason why prior art closed cycle condensing heat engines operate above ambient temperature (i.e., the boiler) is because there is no natural heat sink below ambient temperature that can be used in a condensing system to absorb the heat of vaporization to re-liquefy the vapor discharged from the work generating expansion system. Hence, closed-cycle condensing heat engines operating under the well known laws of thermodynamics must operate above ambient temperature (i.e., the high temperature heat reservoir must be above ambient temperature that is maintained by burning fuel). Unfortunately, burning fuel is expensive and harmful to the environment. However, the drinking bird engine is a cyclic heat engine that does not operate above ambient temperature because it generates an artificial low temperature heat reservoir by evaporating water. Unfortunately, the power densities of these engines are very low. But they are extremely important because they demonstrate the fact that it is possible to construct a cyclic heat engine that converts natural heat energy at ambient temperature in the environment into an unlimited amount of mechanical work. The key to designing this type of engine is finding a method for generating an artificial low temperature heat sink that does not consume more mechanical work than can be generated by the engine.

There is one type of heat engine that can be operated below ambient temperature and produces both mechanical work and refrigeration at very high power densities. As in the drinking bird engine, it operates by utilizing the natural and unlimited heat energy in the environment at ambient temperature as its high temperature heat reservoir by converting this heat energy directly into mechanical work. And it produces power densities far greater that any other heat engine. This engine is a "cryogenic engine." In this engine liquefied working fluid at cryogenic temperature, such as liquefied nitrogen at 77° K. (−196° C. or −321° F.) which is the usual working fluid in cryogenic engines) is compressed to very high pressure (e.g., 500 Bar or 7,252 lbs/in$^2$) by a hydraulic compressor and fed through a plurality of serially connected heat exchangers maintained in thermal contact with the natural environment at ambient temperature, and a like plurality of expanders interposed between adjacent heat exchangers. The high pressure liquefied working fluid entering the first heat exchanger creates a significant temperature gradient across the thermal surfaces and a large amount of natural heat energy is extracted from the environment at ambient temperature and rapidly absorbed by the circulating working fluid at cryogenic temperature. The liquefied working fluid is isobarically heated above its critical temperature (126.3° K. in the case of nitrogen working fluid) and completely vaporized into a super high pressure gas. The vaporization results in a several hundred fold increase in the specific volume of the condensed working fluid. The process is identical to that of feeding compressed water into a high temperature boiler. The water absorbs the heat and vaporizes into high pressure steam resulting in an increase of its specific volume. In the case of the cryogenic engine, the boiler is the natural environment at ambient temperature.

The cryogenic working fluid emerges from the first heat exchanger as a super high pressure, superheated gas at about ambient temperature. It is then fed into the first isentropic expander where a large portion of the heat energy absorbed from the natural environment in the first heat exchanger is converted into mechanical work. The pressure ratio of the first expander is such that the outlet pressure of the expanded gas leaving the expander is still fairly high. Thus, since the expansion process reduces the temperature of the exhaust gas significantly below ambient temperature, it is fed into another ambient heat exchanger that is also maintained in thermal contact with the natural environment in order to extract still more natural thermal energy. After this second isobaric heating process, the pressurized gas is withdrawn from the second ambient heat exchanger at about ambient temperature and fed into a second isentropic expander where a large portion of the natural thermal energy extracted from the environment while circulating through the second heat exchanger is converted into additional mechanical work. This process of absorbing natural thermal energy from the environment and converting it into mechanical work is continued until the exhaust pressure of the gas emerging from the last expander is equal to atmospheric pressure whereupon the gas is discharged into the open atmosphere. The operating details of this cryogenic engine can be found in U.S. Pat. No. 3,451,342 filed Oct. 24, 1965 by E. H. Schwartzman entitled "Cryogenic Engine Systems and Method." Since high-pressure cryogenic expanders are very small, have power densities far higher than any internal combustion engine, operate without generating any sound, and produce no polluting exhaust products, cryogenic engines may represent the ultimate power source for propelling road vehicles. (See the article, "Liquid Nitrogen as an Energy Source for an Automotive Vehicle," *Advances in Cryogenic Engineering*, Vol. 25, 1980, pp. 831–837 by M. V. Sussman.)

Although cryogenic engines operate below the ambient temperature of the natural environment and generate both mechanical work and refrigeration, they are not cyclic heat engines. When the supply of liquefied working fluid at cryogenic temperature is consumed, the engine (and refrigerator) stops operating and must be re-filled with more liquefied gas. Since these engines operate by strictly thermodynamic processes according to the principles of thermodynamics, the expanded working fluid discharged from the last expander cannot be recondensed into a liquid at cryogenic temperature because there is no natural heat sink available at cryogenic temperature to absorb the heat of vaporization. Thus, there is no thermodynamic method that can be used to re-liquify the expanded working fluid in order to enable the engine to operate cyclically. Since the cost of liquefied gas at cryogenic temperature is very expensive, these prior art cryogenic engines are much more expensive to operate then internal combustion engines. However, there is a non-thermodynamic method that can be used to reduce the entropy of the working fluid of a cryogenic engine without having to transfer heat energy to a heat sink if the working fluid is paramagnetic. This method will enable cryogenic engines to be operated cyclically.

It follows from the Carnot equation for refrigators that when $T_L \to 0$, the required input work $W \to \infty$. Thus, it is a physical impossibility to achieve temperatures below approximately 0.4° K. by using strictly thermodynamic processes. For many years this temperature (0.4° K.) was believed to represent an absolute "temperature barrier" which could not be broken because of basic laws of thermodynamics. However, in 1926 Debye proposed using an electromagnetic process that is outside the theoretical framework of classical thermodynamics (i.e., that is not a thermodynamic process) to break this thermodynamic barrier and achieve temperatures that are several orders of magnitude below 0.4° K. This process is called "adiabatic demagnetization" or "magnetic cooling." Basically, this process involves subjecting a paramagnetic substance at low temperature (usually a solid paramagnetic salt) to an intense magnetic field. This external magnetic field will heat the substance. This heating effect is called the heat of magnetization. However, since the substance is paramagnetic, a large number of the magnetic dipoles within the substance will become aligned with the external magnetic field and because of this ordering, the entropy will remain unchanged during this heating. When the heat of magnetization is extracted by a cryogenic heat sink (e.g., liquid helium at 1° K.) the entropy of the magnetized substance decreases by an amount $\Delta S_m$. By thermally isolating the substance and removing the magnetic field, the reduced entropy of the substance remains unchanged but the temperature will fall way below that of the heat sink. By using this non-thermodynamic electromagnetic process (also known as the "magnetocaloric effect"), temperatures as low as 0.0001° K. are possible.

It is important to point out and emphasize that when electromagnetic processes, such as the magnetocaloric effect, are used in conjunction with thermodynamic processes, the results can no longer be predicted within the theoretical framework of classical thermodynamics. For example, when subjecting a paramagnetic substance to a magnetic field, the temperature of the substance increases but its entropy (i.e., the degree of random molecular motion) remains constant due to magnetic alignment. This is thermodynamically impossible. According to thermodynamics, any substance that is heated always results in an increase in entropy. This illustrates the fact that *thermodynamic laws cannot be applied to non-thermodynamic processes.* (See, "Classical Physics Gives Neither Diamagnetism nor Paramagnetism," Section 34-6, page 34-8, in *The Feynman Lectures On Physics*, by R. Feynman, Addison-Wesley Pub. Co., 1964.)

In 1989 the applicant discovered how to make a cryogenic engine operate cyclically (to provide a condensing cryogenic engine) by using a working fluid that is paramagnetic (such as oxygen) and achieving the required decrease in entropy by using the magnetocaloric effect (adiabatic demagnetization) generated by a superconducting solenoid. The technical details are described in my U.S. Pat. No. 5,040,373 entitled "Condensing System And Operating System" issued Aug. 20, 1991. This condensing cryogenic engine invention was important because theoretically it provided a cryogenic engine that operated cyclically capable of converting natural heat energy at ambient temperature into an unlimited amount of mechanical work at high power densities. Prior to this invention such an engine was taken for granted as being impossible because they were viewed as violating the second law of thermodynamics. What has to be pointed out and emphasized here is that the condensing cryogenic engine described in that invention, and in the present invention, do not violate the second law of thermodynamics because some of its operating principles and processes are outside the domain of classical thermodynamics. It is logically impossible for any engine to violate any of the laws of thermodynamics if some of the operating principles are outside the domain of classical thermodynamics. (In addition, as in the case of the drinking bird engine, the operating conditions of that invention do not satisfy the operating conditions of the second law and consequently cannot logically violate that law.)

Unfortunately, the condensing cryogenic engine disclosed in my original patent was not very practical because the condensation ratio (which is the fractional amount of vapor entering the condensing system that actually condenses) was only 6.53%. And this rather poor performance was based on using a superconducting solenoid generating a magnetic field of 100 T (1,000,000 Gauss) which is currently far beyond engineering feasibility. However, the invention was important because in theory, it provided a method for condensing a vapor at cryogenic temperature without transferring heat to a low temperature heat sink by using the magnetocaloric effect. Although the present invention is also based on utilizing the magnetocaloric effect, this effect does not operate on the working fluid. In the present invention the paramagnetic substance is not the working fluid. This will enable 100% of the expanded working fluid discharged from the last expander of a cryogenic engine to be re-liquefied. And this is achieved by using a magnetic field of only 30 T which is well within engineering feasibility. Consequently, the present invention represents a vastly improved magnetic condensing system compared to my original invention.

BRIEF DESCRIPTIONS OF THE INVENTION

A magnetic condensing system is provided for cryogenic engines by generating an artificial low temperature heat sink below ambient temperature by utilizing the magentocaloric effect. The system is designed by creating a plurality of magnetic fields and subjecting a liquefied paramagnetic gas to these fields at cryogenic temperature. The magnetic fields are generated by charging and discharging an even number of thermally insulated, spaced apart, superconducting solenoids having central bores. In the preferred embodiment, the solenoids are connected by a hexagonal non-magnetic metallic conduit passing through each bore that has high thermal conductivity such as copper or aluminum. The solenoids are mounted at each vertex and at the mid-section of each side giving a total of 12 solenoids. Non-magnetic one-way doors are mounted on each side of the bores designed to provide sealed chambers inside each solenoid. A plurality of elongated non-magnetic turbines are mounted at regular intervals inside the conduit between adjacent solenoids. The paramagnetic substance, which represents the heat sink, is saturated liquefied oxygen which is highly paramagnetic at cryogenic temperatures. It is initially held inside the chambers of alternating solenoids by magnetic attractive forces with the doors closed while the adjacent solenoids are vacant without any current and generate no magnetic fields. The liquid in each chamber is magnetized by the magnetic fields and have an initial temperature of 56° K., initial entropy of 2.148 J/gm K, and total initial enthalpy of 83.44 J/gm. The magnetic fields of the energized solenoids acting on the paramagnetic liquefied oxygen in their sealed chambers have a maximum field strength of 30 T.

The energized solenoids containing the liquefied oxygen are simultaneously turned off by transferring the current to the adjacent upstream solenoid that is vacant. By turning off the field in each solenoid containing the paramagnetic liquefied oxygen, the liquid in the sealed chambers undergo demagnetization thereby creating a nearly instantaneous temperature drop of about two degrees to 54.61° and a drop in enthalpy to 81.123 J/gm while the entropy remains constant. This temperature drop in the six solenoids creates a temperature drop throughout the entire length of the conduit surrounding the liquid thereby creating an artificial low temperature heat sink.

After the magnetic fields acting on the liquid are turned off by transferring the current to the adjacent vacant upstream solenoids, the doors between the adjacent solenoids are simultaneously opened. The paramagnetic liquefied gas is immediately pulled out of the solenoids by the magnetic attractive forces of the adjacent upstream energized solenoid in front thereby creating an accelerating flow of liquid through the conduit toward the vacant energized solenoids. The gradient of the magnetic fields of each solenoid is designed to pull the liquid around the central conduit in a clockwise direction. The increasing directed kinetic energy of the streams that are magnetically pulled towards the adjacent vacant solenoids represent the heat of magnetization created by the magnetic fields of the adjacent vacant solenoids. This energy (heat of magnetization) is extracted from the fluid and converted into mechanical work by the non-magnetic turbines mounted in the flow paths of the streams between the adjacent solenoids. As a result, the liquid enters each adjacent solenoid and reaches maximum magnetization with very little directed kinetic energy and hence with a negligible increase in temperature. The process represents isothermal magnetization. Neglecting frictional losses which can be made very small by design, all of the heat of magnetization of the paramagnetic liquid entering the magnetic fields of the vacant adjacent solenoids is converted into an equivalent amount of mechanical work by the rotating turbines. These turbines are connected to electric generators for generating electric current. This current is fed into each energized adjacent solenoid during the charging process to replenish the small current drop caused by the magnetized liquid entering each solenoid by the inductive coupling. The isothermally magnetized liquid undergoes a drop in entropy due to dipole spin alignment with the magnetic fields. After the magnetic fields pulls the liquid into the chambers of the adjacent solenoids, all the doors are closed and a new demagnetization cycle is repeated creating a new temperature drop throughout the entire primary heat transfer conduit.

The decrease in temperature of the central primary heat transfer conduit caused by the demagnetization effect acting repetitively on the paramagnetic liquefied gas is transferred to a copper helical coil (secondary heat transfer conduit) that winds around the central primary conduit and in thermal contact with it. The design is such that the magnetic cooling effect generated in the primary conduit is extended into the secondary conduit. Thus, by feeding partially compressed low temperature noncondensed vapor discharged from the last expander of a cryogenic engine through the secondary conduit (condensing tube), the heat of vaporization is extracted by the temperature differential maintained by the circulating paramagnetic liquefied oxygen, and the vapor is liquefied. All the noncondensed vapor entering the secondary helical conduit leaves the conduit as condensed liquid at cryogenic temperature.

In the preferred embodiment, the cryogenic working fluid used in the cryogenic engine is nitrogen. Nitrogen is slightly diamagnetic and is not effected by the magnetic fields. Before feeding the liquefied nitrogen back into the cryogenic engine it is utilized as a cryogenic coolant for the superconducting solenoids which are constructed with high-temperature superconducting wire.

DRAWINGS

These and other advantages and features of the present invention will be apparent from the disclosure, which includes the specification with the foregoing and ongoing description, the claims and the accompanying drawings wherein:

FIG. 6 is a schematic longitudinal view of an automobile propelled with a cryogenic engine equipped with a magnetic condenser mounted underneath the chassis;

FIG. 7 is an enlarged longitudinal perspective view of the primary heat transfer conduit between two adjacent solenoids further illustrating the design and construction of the magnetic energy turbines mounted inside;

FIG. 8 is an enlarged transverse cross-sectional view illustrating the design and construction of the turbine supporting sleeves;

Figure 10:
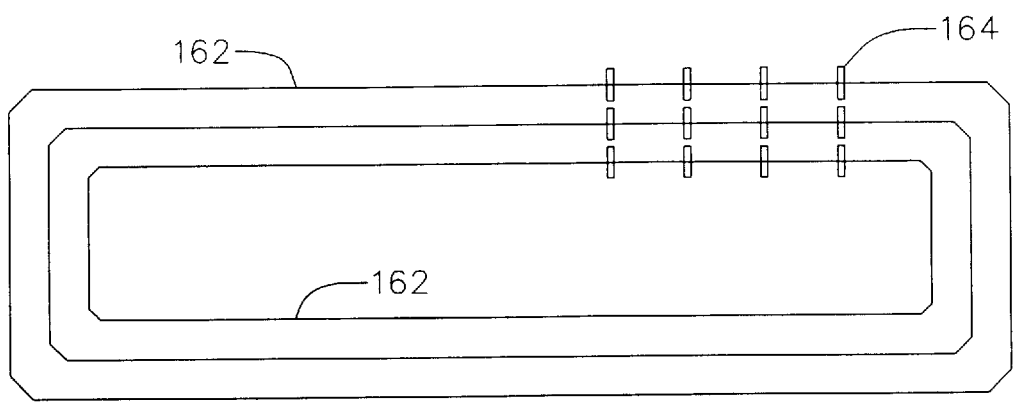
Figure 11:
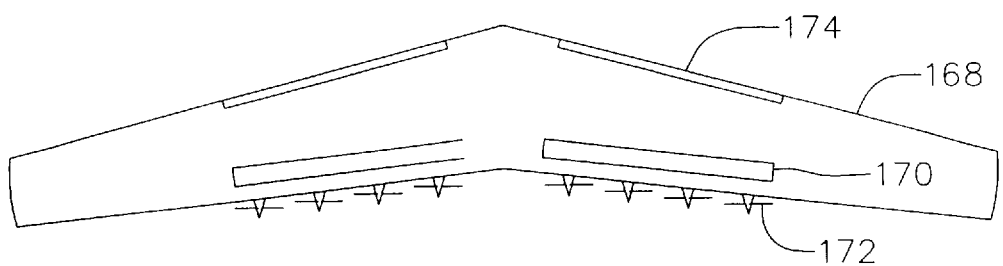

FIG. 10 is a schematic plan view of a very large magnetic condensing system comprising several elongated primary heat transfer tube loops several meters long that could be mounted inside the wings of large propeller-driven commercial aircraft; and FIG. 11 is a schematic plan view illustrating a very large commercial aircraft designed as a Northrop flying wing powered by two 11,304 HP condensing cryogenic engines driving 8 propellers.

DESCRIPTION OF THE PREFERRED EMBODIMENT

The basic underlying physical principles that are utilized in the design of the magnetic condensing system described herein are the principles of adiabatic demagnetization also known as "magnetic cooling" or the "magnetocaloric effect." Therefore, before describing the detailed design and operating features of the magnetic condensing system, it will be useful to review the basic operating principles of adiabatic demagnetization, and how these principles are used in prior art refrigeration systems. This will provide a basic understanding of the unique operating features of the present invention that are easily distinguishable from the prior art.

In making this comparison it is important to point out and emphasize at the outset that all prior art "magnetic" refrigeration systems utilizing the magnetic cooling principles of adiabatic demagnetization use a paramagnetic substance that is either solid, or in a powered form. In the present invention, the paramagnetic substance is a liquid at cryogenic temperature. (It could also be a compressed gas.) Consequently, the present invention is fundamentally different from all prior art magnetically cooled refrigeration systems and therefore is clearly distinguishable from all prior art refrigeration systems using adiabatic demagnetization. The second reason for this review is to develop the basic analytical equations which will provide a general mathematical framework to quantitatively investigate the design and performance of the present invention (i.e., a mathematical framework for the underlying theory).

Figure 1:
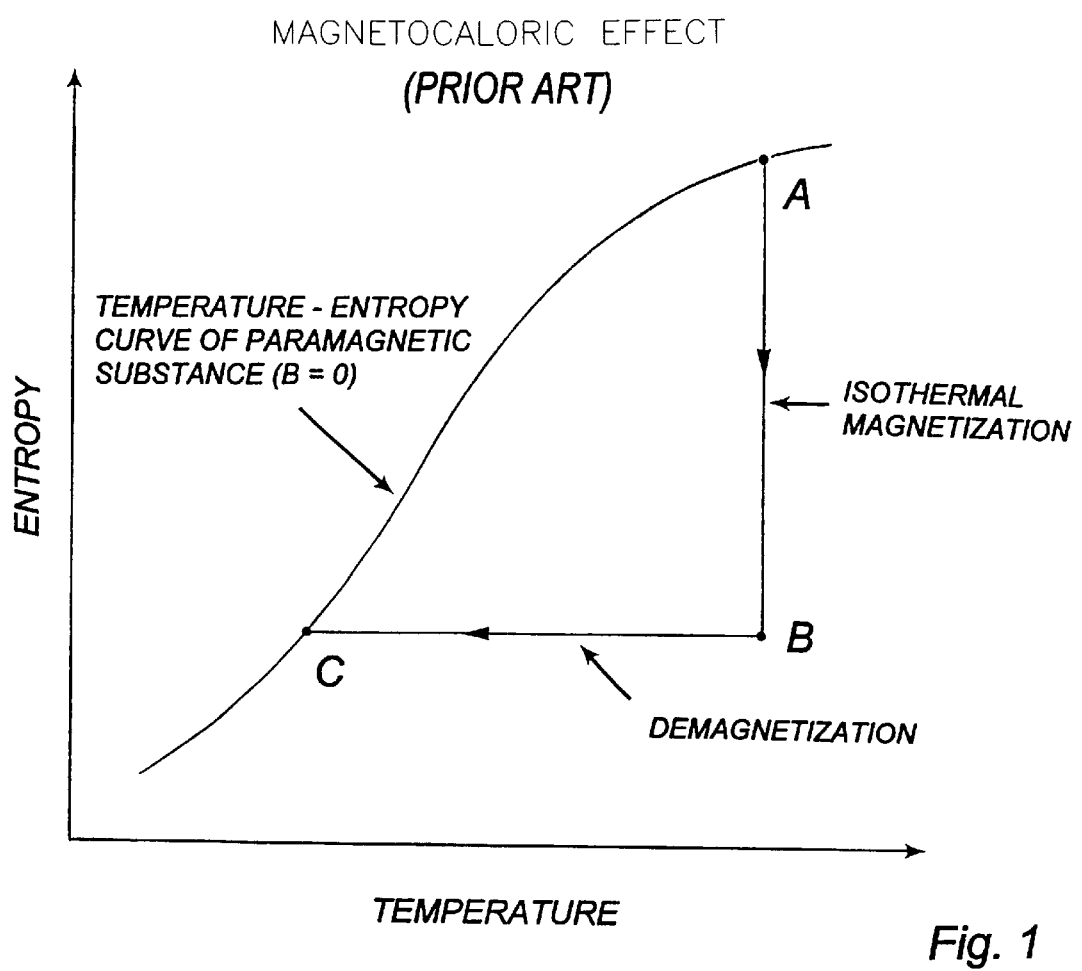
FIG. 1 is a Temperature-Entropy diagram of a paramagnetic substance illustrating the basic thermodynamic operating principles of adiabatic demagnetization.

FIG. 1 is a Temperature—Entropy diagram of a paramagnetic substance illustrating the basic thermodynamic operating principles of adiabatic demagnetization. Referring to this figure, the process begins at point A which denotes the initial temperature $T_1$, and the initial entropy $S_1$, of the paramagnetic substance. As is usually the case, the substance is rigidly mounted on a support structure between the poles of an electromagnet and thermally insulated from the environment. The application of the magnetic field results in two physical effects: (1) the substance becomes magnetized due to partial alignment of the magnetic dipoles with the applied magnetic field, and (2) it heats up. The heating is caused by motion in the underlying crystal structure due to magnetic forces acting on the molecules. A solid paramagnetic substance carries thermal energy by atomic vibrations that vibrate along random directions when there is no external magnetic field. However, when it is subjected to an external magnetic field it has less heat capacity because it has fewer vibrational modes to store thermal energy due to magnetic dipole alignment with the external magnetic field. Consequently, in order to carry the same amount of thermal energy as it had before being magnetized its temperature must increase.

Since the substance is paramagnetic, dipole alignment with the external magnetic field B will prevent the entropy from increasing during this heating (i.e., during the magnetization). The system is designed such that the heat of magnetization $\Delta H_m$ is absorbed by a liquid helium reservoir at 1° K. which surrounds the substance and also positioned between the poles. Since the heat of magnetization is extracted during the magnetization process, the entropy is reduced by an amount $\Delta S_m$. Referring to FIG. 1, this isothermal magnetization process is represented thermodynamically on the Temperature—Entropy diagram by the movement vertically downward from point A to point B illustrating a drop in entropy $\Delta S_m = S_1 - S_2$ at constant temperature $T_1$ given by $$\Delta S_m = \frac{MB}{2T_1} \quad (1)$$

where M denotes the magnetization expressed in units of J/(gm T) and B denotes the magnetic field strength expressed in units of Tesla (T). (One Tesla=10,000 Gauss. MKS system of units is used in all equations.) The heat of magnetization $\Delta H_m$ is given by $$\Delta H_m = T_1 \Delta S_m \quad (2)$$

In view of equations (1) and (2), the heat of magnetization $\Delta H_m$ can also be expressed as $$\Delta H_m = \frac{MB}{2} \quad (3)$$

After the heat of magnetization $\Delta H_m$ has been extracted from the substance by the liquid helium, and the substance is at point B on the Temperature—Entropy diagram, it is thermally insulated from the surrounding liquid helium and the magnetic field is turned off. By turning off the field, the substance undergoes adiabatic demagnetization and the temperature drops to the final temperature $T_2$ represented by the horizontal line segment BC on the Temperature—Entropy diagram of FIG. 1.

The temperature drop can be determined as follows: Let C denote the heat capacity of the substance at temperature $T_1$, and let $\Delta T_m$ denote the temperature drop due to the adiabatic demagnetization effect. Consequently, the heat loss in the substance due to the adiabatic demagnetization effect can be expressed approximately as $C\Delta T_m$. Since the heat of magnetization $\Delta H_m$ is equal to the heat loss, it follows that $C\Delta T_m = \Delta H_m$. Hence, the temperature drop $\Delta T_m$ due to the adiabatic demagnetization effect can be calculated to a good approximation by the equation $$\Delta T_m = \frac{\Delta H_m}{C} \quad (4)$$

A more detailed analytical exposition of adiabatic demagnetization (the magnetocaloric effect) can be found in the books: *Principles and Application of Magnetic Cooling*, North-Holland Publishing Co., 1972 by R. P. Hudson; *Magnetic Cooling*, Harvard Monographs In Applied Science, No. 4, 1954 by C. Garrett; and *Experimental Techniques In Low-Temperature Physics*, Oxford Press, 1968 by G. White. By using these methods temperatures $T_2 = T_1 - \Delta T_m$ as low as 0.001° K. can be reached. In the present invention, however, the magnetocaloric effect will be used to obtain a heat sink at cryogenic temperature by using the paramagnetic substance to absorb thermal energy $Q_m$ at temperature $T_1$ where the amount of heat energy absorbed $Q_m = \Delta H_m = C\Delta T_m$.

In order to calculate the entropy drop $\Delta S_m$, the heat of magnetization $\Delta H_m$, and the temperature drop $\Delta T_m$, of a paramagnetic substance undergoing the process of adiabatic demagnetization described in equations 1–4 it is necessary to calculate the magnetization M of the substance at a certain temperature T when subjected to a magnetic field of a given intensity B. Although magnetization calculations of paramagnetic substances are usually obtained by an approximation using Curie's Law, it will be accurately obtained herein using exact equations from quantum mechanics.

Let $\vec{\mu}$ denote the magnetic dipole moment of a single molecule of the paramagnetic substance. (A magnetic dipole $\vec{\mu}$ is a very small circular loop having current i and radius R defined as $i\vec{A}$ where $\vec{A}$ is a vector having magnitude equal to the area of the loop $A = \pi R^2$ with direction normal to the loop determined by the direction of the current using the standard right-hand rule.) In quantum mechanics the scalar magnetic dipole moment of a substance can be expressed as $g\sqrt{J(J+1)}\mu_B$ where g is a constant called the g-factor, J is the total angular momentum quantum number, and $\mu_B$ is a constant called the Bohr magnetron. One Bohr magnetron $\mu_B$ is equal to $9.273 \times 10^{-24}$ Joules/Tesla. (Joules/Tesla=amp m$^2$) If the substance is in a region of space where there is no magnetic field, then the directions of the magnetic dipole moments $\vec{\mu}$ of all the individual molecules have a random distribution because of thermal motion, and hence the substance as a whole, exhibits no net magnetism. However, if there is an external magnetic field, then a certain fraction f of the individual dipoles will become aligned with the external field. The stronger the field, the greater the alignment; and the lower the temperature, the greater the alignment. The substance is said to have paramagnetic saturation when all of the dipoles are aligned with the magnetic field. In classical electromagnetic theory, the resulting magnetization $M_0$ corresponding to paramagnetic saturation is given by $M_0 = N\mu$ where N denotes the number of molecules per unit mass. In quantum mechanics however, it is impossible for all the dipoles to be aligned with the external field because of spatial quantization. Hence, in quantum mechanics, the maximum possible magnetization $M_0$ will be somewhat less than that predicted from classical electromagnetic theory. In quantum mechanics $M_0 = NgJ\mu_B$. By setting N equal to Avogadro's number $6.022169 \times 10^{23}$ molecules/mole, and dividing by the molecular weight M of the substance, the magnetization $M_0$ is obtained in units of Joules/(gm Tesla). Hence, $$M_0 = \frac{NgJ\mu_B}{M} \quad (5)$$

In practice, it is impossible to achieve complete paramagnetic saturation. Hence, the actual magnetization M that results from partial alignment is given by $$M = fM_0 \quad (6)$$

Omitting the mathematical details, it can be shown that the equation giving the magnetization fraction f of a paramagnetic substance at temperature T subjected to a magnetic field of intensity B is $$f = \frac{M}{M_0} = \left(\frac{2J+1}{2J}\right)\coth\left[\left(\frac{2J+1}{2J}\right)a\right] - \left(\frac{1}{2J}\right)\coth\left(\frac{a}{2J}\right) \quad (7)$$

where the parameter $$a = \frac{gJ\mu_B B}{kT}$$

and k=Boltzmann's constant equal to $1.38062 \times 10^{-23}$ Joules/K°. The function on the right hand side of equation (7) is called the "Brillouin function." (See, *Modern Magnetism*, Cambridge University Press, 1963, pp. 43–44 by L. F. Bates; and "Tables of the Brillouin Function and of the Related Function for the Spontaneous Magnetization," *British Journal of Applied Physics*, Vol. 18, 1967, pp. 1415–1417 by M. Darby.)

To understand the basic operating principles of the present invention it is important to point out and emphasize that the phenomenon of adiabatic demagnetization described above, and illustrated thermodynamically in FIG. 1, applies to all paramagnetic substances whether they are solid, gaseous, or liquid. In the preferred embodiment of the invention the paramagnetic substance will be liquified oxygen at an initial temperature $T_1 = 56°$ K. which is just above the triple point (54.359° K.). (Liquefied oxygen is the most paramagnetic liquid at cryogenic temperatures.) For oxygen, with molecular weight M=32, g=2 and J=1. Hence, $\mu = 2.828 \mu_B$. The magnetic field will be generated by a superconducting solenoid having a maximum field strength B=30 T. The heat capacity C of saturated liquid oxygen at 56° K. is 1.6616 J/(gm K). (This value is obtained from The National Bureau of Standards Report, *The Thermodynamic Properties Of Oxygen From 20° K. to 100° K.*, Technical Report No. 2, Project No. A-593, National Bureau of Standards Contract No. CST-7339, Mar. 1, 1962 by J. C. Mullins, et al., page 40.) Upon substituting these quantities into the above equations, the operating parameters (8) of the adiabatic demagnetization process and the heat absorbing capacity $Q_m = \Delta H_m$ at temperature $T_1$ of the preferred embodiment of the magnetic condensing system are:

$$\begin{vmatrix} T_1 = 56° \text{ K.} \\ B = 30 \text{ T} \\ f = 0.44251 \\ M = 0.15445 \text{ J/(gmT)} \\ \Delta S_m = 0.04137 \text{ J/(gmK)} \\ Q_m = \Delta H_m = 2.31679 \text{ J/gm} \\ \Delta T_m = 1.394° \text{ K.} \end{vmatrix} \quad (8)$$

The fact that the phenomenon of adiabatic demagnetization described above and illustrated in FIG. 1, along with equations 1–7 holds for all paramagnetic substances whether they are solid, liquid, or gaseous is important in the present invention because by choosing a paramagnetic substance that is liquid or gaseous, it will be possible to extract the heat of magnetization $\Delta H_m$ without using any external low temperature heat sink such as liquefied helium (which is very expensive). Contrary to the prior art, this can be achieved by initially placing liquefied oxygen in a sealed chamber positioned some distance away from a charged superconducting solenoid that is connected to the chamber by a straight, thermally insulated, non-magnetic conduit that is coaxial with the solenoid's bore. If there is nothing in the conduit to obstruct the flow when the fluid is released from the chamber, the magnetic attractive forces $F_m$ will continuously accelerate the fluid through the conduit into the bore of the solenoid. And, while moving through the conduit, it becomes magnetized by virtue of moving into a region having higher magnetic intensity. In this process, the heat of magnetization $\Delta H_m$ will be represented by the increasing directed kinetic energy of the substance as it is accelerated through the conduit into the bore. It follows from the principle of conservation of energy that the heat of magnetization $\Delta H_m$ (given by equation 3) must be represented by the increase in kinetic energy of the paramagnetic fluid as it enters the bore of the superconducting solenoid. (For liquids and gases, most of the thermal energy, (heat content of a substance), is represented by the kinetic energy of the molecules. For solid substances, most of the thermal energy is in the form of vibrational energy.) Since the total energy of the system must remain constant, the increase in the directed kinetic energy of the fluid moving through the conduit corresponds to an equivalent decrease in the energy of the solenoid's magnetic field. This decrease in the energy of the magnetic field of the solenoid, which is manifested by a small current drop, results from the inductive coupling between the dipoles entering the field and the field of the solenoid. This energy drop is equal to the heat of magnetization $\Delta H_m$.

Figure 2:
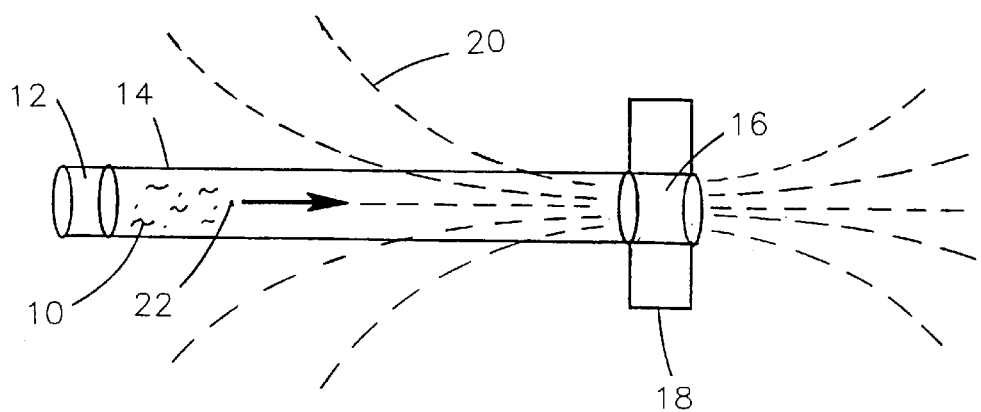
FIG. 2 is a perspective longitudinal cross-section of a non-magnetic conduit connected to the bore of a superconducting solenoid illustrating an accelerating flow stream of paramagnetic fluid accelerating through the conduit under magnetic attractive forces generated by the magnetic field of the superconducting solenoid.

FIG. 2 describes a paramagnetic fluid 10 (assumed to be liquefied oxygen with an initial temperature of 56° K.) accelerating from a sealed chamber 12 through a 0.50 m (19.7 in) long non-magnetic conduit 14 leading into the central bore 16 of a charged superconducting solenoid 18 by magnetic attractive forces $F_m$. The process of moving through the conduit 14 toward the charged superconducting solenoid 18, i.e., moving into the magnetic field 20 of the superconducting solenoid 18 by virtue of moving through the conduit 14, represents the magnetization process of the paramagnetic fluid in the present invention. Since this acceleration and magnetization process represents the theoretical operating basis of the invention (and hence its operability), that distinguishes the invention from the prior art, this motion of the fluid through the conduit by magnetic attractive forces will now be determined and investigated quantitatively.

Since the paramagnetic substance 10 is a fluid, the magnetic force is assumed to act on every individual droplet 22, composed of many individual dipoles, that remain a droplet when accelerating through the conduit 14. The magnetic field 20 of the superconducting solenoid 18 outside the bore 16 is almost identical to that of a circular coil, carrying a current $i_1$, and having a certain radius $R_1$. Let the radius of a small dipole carrying a current $i_2$ that is aligned with the magnetic field of the solenoid 18 be denoted by $R_2$ so that the dipole is represented quantitatively by $i_2 A_2 = i_2 \pi R_2^2$.

The magnetic force of attraction F between two coaxial coils having radii $R_1$ and $R_2$ carrying currents $i_1$ and $i_2$ respectively, where $R_1 \gg R_2$, separated by a distance d is $$F = \frac{3\pi \mu_0 i_1 i_2 R_1^2 R_2^2 d}{2(R_1^2 + d^2)^{5/2}} \quad (9)$$

where $\mu_0 = 4\pi \times 10^{-7}$ N/amp$^2$ is a constant called the permeability of free space. This equation applies to very small radii $R_2$ and currents $i_2$, even atomic and molecular dipoles. (See Section 5.11 "The Force On A Coil In A Magnetic Field," pages 109–114 in *Electromagnetism for Engineers: An Introductory Course*, Pergamon Press, 1964, by P. Hammond.) The axial magnetic field intensity B generated by the larger coil (the superconducting solenoid) a distance d from its center is $$B = \frac{\mu_0 i_1 R_1^2}{2(R_1^2 + d^2)^{3/2}} \quad (10)$$

Upon substituting equation (10) into equation (9), the magnetic force acting on the small coil generated by the magnetic field B of a large coil can be expressed as $$F = \frac{3 B i_2 \pi R_2^2 d}{R_1^2 + d^2} \quad (11)$$

By taking the small coil to represent a very small current loop on the molecular level, the quantity $i_2 \pi R_2^2 = i_2 A_2$ represents a magnetic dipole moment $\mu$. Since the distances are so small on the molecular level, it follows that if there are a large number N of dipoles $i_2 A_2$ aligned with the magnetic field B at distance d from the solenoid inside a small droplet of the paramagnetic fluid, the magnetic force acting on the droplet due to the magnetic field of the solenoid is $F_m = NF$. By definition, the magnetization $M = N i_2 A_2 /$(unit mass). Since the magnetic field inside the conduit 14 is nearly parallel with the central axis of the conduit, the direction of the magnetic force acting on the fluid 10 moving through the conduit 14 can be assumed to be parallel to the conduit's central axis where the magnetic intensity B is given by equation (10). Consequently, the magnetic force acting on a small droplet of unit mass moving through the conduit can be expressed as $$F_m = \frac{3B(Ni_2 \pi R_2^2)d}{R_1^2 + d^2} = \frac{3BMd}{R_1^2 + d^2} \quad (12)$$

Since the magnetization M of any paramagnetic substance in a magnetic field is given by equation (6) where $M_0$ is given by equation (5), the magnetic attractive force $F_m$ acting on the droplet having a mass of one gm can be expressed as $$F_m = \frac{3Bf M_0 d}{R_1^2 + d^2} \quad (13)$$

where the magnetization fraction f is given by equation (7).

It is assumed that the droplets are all homogeneous such that the magnetization M of a large droplet having a mass of 1.0 gm is identical to the magnetization of a very small droplet having a mass of 0.001 gm. Consequently, since the mass of the magnetized droplet in equation (13) is taken to be 1.0 gm, the acceleration a of all droplets moving through the conduit at distance d from the superconducting solenoid is given by $$a = \frac{F_m}{0.001 \text{ kg}} \quad (14)$$

where $F_m$ is equal to the magnetic attractive force acting on a one gm droplet given by equation (13).

The velocity v of a particle accelerating along a straight line with constant acceleration a over a small distance s is given by $$v = \sqrt{2as}$$

Consequently, the incremental velocity increase inside the conduit is given by $$dv = \Delta v_i = \frac{a \Delta d}{v} \quad (15)$$

where $\Delta d$ will be taken to be 0.01 m. Since the initial velocity is assumed to be zero, the first velocity increment after moving the first increment of distance $\Delta d$, will be equal to $\Delta v_1 = \sqrt{2a \Delta d}$. The velocity v at distance d is calculated numerically by $$v(d) = \Sigma \Delta v_i \quad (16)$$

The thickness of the coil representing the superconducting solenoid in equation (10) with radius $R_1$ is assumed to be 0. In order to achieve greater accuracy, the coil will be assumed to be a single layer solenoid such that the magnetic field strength B at a distance d along the central axis is given by $$B = \left(\frac{\mu_0 n i}{2L}\right)\left[\frac{d + L}{\sqrt{R^2 + (d+L)^2}} - \frac{d}{\sqrt{R^2 + d^2}}\right] \quad (17)$$

where n denotes the number of turns in the coil, i denotes the current, and L and R denote the coil length and coil radius respectively. (See, *Electricity and Magnetism*, Addison-Wesley Publishing Co., Inc., Cambridge Mass., 1951, pp. 272–273, by Francis Sears.) Thus, in calculating the acceleration through the tube; the magnetic field strength B in equation (13) will be calculated using equation (17) instead of equation (10). Since we want the magnetic field strength B atthe front of the solenoid (at distance d=0) to be close to the maximum magnetic field strength inside the center of the bore for this numerical investigation, the solenoid will be assumed to be very thin. Thus, the size parameters of the coil will be assumed to be L=0.01 m, R=0.15 m. It follows from equation (17) that the magnetic field strength $B_{max}$ at the center of the solenoid is $$B_{max} = \frac{\mu_0 n i}{\sqrt{L^2 + 4R_1^2}}$$

Consequently, assuming that the coil has 100 turns and the-field strength at the-center-of the solenoid is 30 T (300,000 Gauss), the current i in the superconductor will be 71,659 amp which is well within engineering feasibility.

The numerical calculations of the flow of the liquefied oxygen through the conduit under the magnetic attractive forces of the superconducting solenoid will proceed by calculating the magnetic field strength B at various distances d using equation (17), determining the corresponding magnetization M of a droplet by equations (5), (6), and (7), determining the value of the magnetic force $F_m$ acting on a one gm droplet by equation (13), calculating the acceleration of the droplet by equation (14), and calculating the velocity by equation (16).

Table 1 gives the numerical results of the calculations where the distances d are listed in cm from the front of the solenoid. The liquefied oxygen has an initial temperature T=56° K. It is released from the sealed chamber at an initial distance d=50 cm (0.5 m) from the superconducting solenoid generating a central field of 30 T. The parameters listed in the Table are:

d=distance of droplet from solenoid (cm)
B=magnetic field strength (T) at distance d
f=magnetization fraction at distance d
M=magnetization (J/gm T) of droplet at distance d
$\Delta H_m$=value of heat of magnetization (J/gm) at distance d determined by equation (3)
KE=kinetic energy (J/gm) of a one gm droplet moving at velocity v at distance d
$F_m$=magnetic attractive force (Newtons) acting on a magnetized droplet having a mass of 1.0 $\mu$m at distance d
a(g)=acceleration of droplets at distance d in units of g (1.0 g=9.81 m/sec$^2$)
v=velocity (m/sec) of droplet at distance d.

TABLE 1

Magnetization and Acceleration Parameters of Liquified Oxygen Undergoing Magnetization by Flowing Through a 50 cm Long Non-Magnetic Conduit Pulled By Magnetic Attractive Forces Toward A Superconducting Solenoid Generating a Central Magnetic Field of 30 T (Coil Radius = 0.15 m, Coil Length = 0.01 m)

| d(cm) | B(T) | f | M(J/gm T) | $\Delta H_m$(J/gm) | KE(J/gm) | F(N) | a(g) | v(m/sec) |
|---|---|---|---|---|---|---|---|---|
| 50.0 | .69 | .0111 | .0039 | .0013 | .0000 | .0148 | 1.50 | 0.00 |
| 49.0 | .73 | .0117 | .0041 | .0015 | .0001 | .0167 | 1.71 | 0.54 |
| 48.0 | .77 | .0124 | .0043 | .0017 | .0004 | .0191 | 1.94 | 0.85 |
| 47.0 | .82 | .0131 | .0046 | .0019 | .0006 | .0217 | 2.22 | 1.08 |
| 46.0 | .87 | .0139 | .0049 | .0021 | .0008 | .0248 | 2.53 | 1.28 |
| 45.0 | .92 | .0147 | .0051 | .0024 | .0011 | .0284 | 2.90 | 1.47 |
| 44.0 | .98 | .0156 | .0055 | .0027 | .0014 | .0326 | 3.33 | 1.67 |
| 43.0 | 1.04 | .0166 | .0058 | .0030 | .0017 | .0375 | 3.83 | 1.86 |
| 42.0 | 1.11 | .0177 | .0062 | .0034 | .0021 | .0433 | 4.42 | 2.06 |
| 41.0 | 1.18 | .0189 | .0066 | .0039 | .0026 | .0501 | 5.11 | 2.27 |
| 40.0 | 1.26 | .0201 | .0070 | .0044 | .0031 | .0581 | 5.92 | 2.49 |
| 39.0 | 1.34 | .0215 | .0075 | .0050 | .0037 | .0675 | 6.88 | 2.73 |
| 38.0 | 1.44 | .0230 | .0080 | .0058 | .0044 | .0786 | 8.02 | 2.97 |
| 37.0 | 1.54 | .0246 | .0086 | .0066 | .0052 | .0919 | 9.37 | 3.24 |
| 36.0 | 1.65 | .0264 | .0092 | .0076 | .0062 | .1077 | 10.98 | 3.52 |
| 35.0 | 1.77 | .0283 | .0099 | .0087 | .0073 | .1266 | 12.91 | 3.83 |
| 34.0 | 1.90 | .0304 | .0106 | .0101 | .0086 | .1493 | 15.22 | 4.16 |
| 33.0 | 2.05 | .0328 | .0114 | .0117 | .0102 | .1765 | 17.99 | 4.52 |
| 32.0 | 2.21 | .0353 | .0123 | .0136 | .0120 | .2093 | 21.34 | 4.91 |
| 31.0 | 2.39 | .0381 | .0133 | .0159 | .0142 | .2491 | 25.39 | 5.33 |
| 30.0 | 2.58 | .0412 | .0144 | .0186 | .0168 | .2972 | 30.30 | 5.80 |
| 29.0 | 2.80 | .0447 | .0156 | .0218 | .0199 | .3558 | 36.27 | 6.31 |
| 28.0 | 3.03 | .0485 | .0169 | .0257 | .0237 | .4272 | 43.55 | 6.88 |
| 27.0 | 3.30 | .0527 | .0184 | .0303 | .0281 | .5146 | 52.46 | 7.50 |
| 26.0 | 3.59 | .0573 | .0200 | .0359 | .0335 | .6217 | 63.37 | 8.19 |
| 25.0 | 3.91 | .0625 | .0218 | .0427 | .0400 | .7533 | 76.79 | 8.94 |
| 24.0 | 4.27 | .0682 | .0238 | .0509 | .0479 | .9153 | 93.30 | 9.79 |
| 23.0 | 4.68 | .0746 | .0261 | .0609 | .0575 | 1.1150 | 113.66 | 10.72 |
| 22.0 | 5.13 | .0818 | .0285 | .0731 | .0692 | 1.3614 | 138.78 | 11.76 |
| 21.0 | 5.63 | .0897 | .0313 | .0880 | .0835 | 1.6657 | 169.80 | 12.92 |
| 20.0 | 6.18 | .0985 | .0344 | .1063 | .1009 | 2.0412 | 208.08 | 14.21 |
| 19.0 | 6.81 | .1084 | .0378 | .1287 | .1224 | 2.5041 | 255.26 | 15.65 |
| 18.0 | 7.50 | .1193 | .0416 | .1562 | .1487 | 3.0730 | 313.25 | 17.25 |
| 17.0 | 8.28 | .1315 | .0459 | .1899 | .1810 | 3.7694 | 384.24 | 19.03 |
| 16.0 | 9.14 | .1450 | .0506 | .2313 | .2207 | 4.6165 | 470.59 | 21.01 |
| 15.0 | 10.10 | .1599 | .0558 | .2819 | .2693 | 5.6378 | 574.70 | 23.21 |
| 14.0 | 11.16 | .1764 | .0616 | .3435 | .3286 | 6.8546 | 698.74 | 25.64 |
| 13.0 | 12.33 | .1944 | .0678 | .4183 | .4007 | 8.2808 | 844.12 | 28.31 |

TABLE 1-continued

Magnetization and Acceleration Parameters of Liquified Oxygen Undergoing Magnetization by Flowing Through a 50 cm Long Non-Magnetic Conduit Pulled By Magnetic Attractive Forces Toward A Superconducting Solenoid Generating a Central Magnetic Field of 30 T
(Coil Radius = 0.15 m, Coil Length = 0.01 m)

| d(cm) | B(T) | f | M(J/gm T) | $\Delta H_m$(J/gm) | KE(J/gm) | F(N) | a(g) | v(m/sec) |
|---|---|---|---|---|---|---|---|---|
| 12.0 | 13.61 | .2139 | .0747 | .5082 | .4878 | 9.9163 | 1010.84 | 31.23 |
| 11.0 | 15.01 | .2350 | .0820 | .6153 | .5920 | 11.7375 | 1196.48 | 34.41 |
| 10.0 | 16.51 | .2573 | .0898 | .7413 | .7152 | 13.6848 | 1394.99 | 37.82 |
| 9.0 | 18.10 | .2807 | .0980 | .8869 | .8586 | 15.6505 | 1595.36 | 41.44 |
| 8.0 | 19.77 | .3048 | .1064 | 1.0517 | 1.0222 | 17.4678 | 1780.61 | 45.22 |
| 7.0 | 21.48 | .3291 | .1149 | 1.2335 | 1.2044 | 18.9080 | 1927.43 | 49.08 |
| 6.0 | 23.19 | .3529 | .1232 | 1.4277 | 1.4009 | 19.6925 | 2007.40 | 52.93 |
| 5.0 | 24.84 | .3754 | .1310 | 1.6269 | 1.6047 | 19.5234 | 1990.15 | 56.65 |
| 4.0 | 26.37 | .3958 | .1381 | 1.8213 | 1.8059 | 18.1379 | 1848.92 | 60.10 |
| 3.0 | 27.71 | .4134 | .1443 | 1.9990 | 1.9918 | 15.3767 | 1567.45 | 63.12 |
| 2.0 | 28.79 | .4273 | .1491 | 2.1471 | 2.1486 | 11.2510 | 1146.89 | 65.55 |
| 1.0 | 29.56 | .4369 | .1525 | 2.2537 | 2.2625 | 5.9833 | 609.92 | 67.27 |
| 0.0 | 29.95 | .4419 | .1542 | 2.3095 | 2.3228 | 0.0001 | 0.01 | 68.16 |

Figure 3:
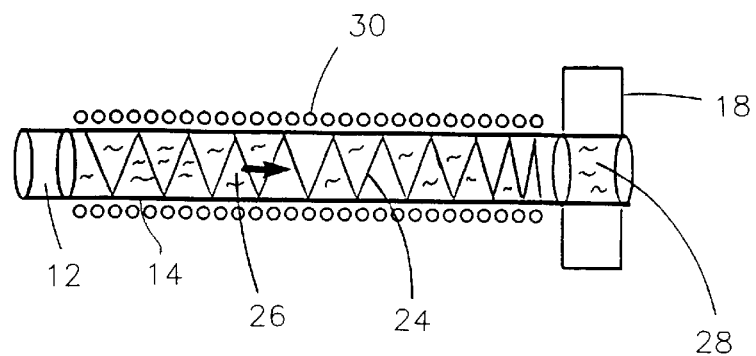
FIG. 3 is a perspective longitudinal cross-section of the non-magnetic conduit shown in FIG. 2 illustrating how the kinetic energy of the accelerating paramagnetic fluid is converted into mechanical work by mounting a non-magnetic rotating turbine in the flow stream inside the conduit.

When the liquefied oxygen is accelerating through the conduit and becoming magnetized by virtue of the increasing magnetic field strength B, all of the motion is essentially translational and directed along the conduit's central axis. The table shows that when the fluid reaches the solenoid and enters the bore (d=0) its velocity v will be 68.16 m/sec. Within the limits of the numerical accuracy of the calculations, this table confirms the fact that the kinetic energy KE corresponding to this velocity is equal to the heat of magnetization $\Delta H_m$. Since the fluid is assumed to decelerate very quickly inside the bore (and held inside the bore), the flow becomes turbulent and intermolecular collisions will transform the directed motion through the conduit into random motion inside the bore. This will result in an increase in the temperature of the fluid, and this increase in temperature will be equal to the heat of magnetization $\Delta H_m$. However, by mounting a non-magnetic rotating turbine 24 in this flow stream 26 inside the conduit 14 as shown in FIG. 3, it will be possible to convert this directed kinetic energy of the paramagnetic fluid flowing through the conduit into mechanical work without having to use any external heat sink as in prior art adiabatic demagnetization processes that use traditional paramagnetic salts that are solid. Thus, after passing through the turbine 24, the magnetized flow stream enters the bore of the solenoid with very little velocity. There is essentially no increase in temperature. The result is isothermal magnetization that is achieved without transferring the heat of magnetization $\Delta H_m$ to any cryogenic heat sink because it is converted into mechanical work by the turbine. This fact, together with the fact that adiabatic demagnetization giving the temperature drop described by equation (4) applies to all paramagnetic substances undergoing demagnetization whether they are solid or not demonstrates the basic operating feasibility of the present invention.

In further contemplating the meaning of the numerical results of Table 1 it should be pointed out that except for $\Delta H_m$ (heat of magnetization) obtained from equation (3), all the other equations that generated the numbers describing the flow through the conduit are based on electromagnetic equations involving magnetic forces between current carrying coils, magnetization of paramagnetic substances, and elementary dynamics of motion that have nothing to do with adiabatic demagnetization. The calculations based on these equations given in the table show that the kinetic energy KE of the fluid entering the solenoid (at d=0) will indeed be equal (within the accuracy of the calculations) to the heat of magnetization $\Delta H_m$. This fact was only asserted at the beginning of this application as an assumption on the grounds of conservation of energy. The calculations show that it is a mathematical fact. It should also be pointed out that this result is not the result of the form or structure of the mathematical equations giving the force, acceleration, and velocity of the fluid inside the conduit because equation (13), giving the force, where the magnetization fraction f and magnetic field strength B are given by equations (7) and (17), respectively, are extremely complicated. Therefore, the numerical calculations given in Table 1 are very important because they provide analytical proof of the fundamental operating principle upon which the present invention is based. Namely, by using a paramagnetic fluid instead of a solid (or powder), and carrying out the magnetization process by letting the unmagnetized paramagnetic fluid flow into a magnetic field inside a conduit, it will be possible to achieve isothermal magnetization without using any external heat sink by converting the heat of magnetization into mechanical work. By inserting a non-magnetic turbine in the conduit (in the flow stream) as shown in FIG. 3, it will be possible to convert the kinetic energy of the stream directly into mechanical work thereby achieving isothermal magnetization without using any external heat sink. The numerical values given in Table 1 will enable the turbine to be designed to achieve high mechanical efficiency. But the most important result of this table is that the underlying operating theory and principle of the invention is established because once isothermal magnetization without any external heat sink is achieved, the demagnetization process (magnetocaloric effect) will reduce the temperature of the fluid below the initial temperature, and this temperature drop will enable the paramagnetic fluid to absorb an equivalent amount of heat corresponding to the temperature drop. Thus, the paramagnetic fluid becomes an artificial cryogenic heat sink.

Several other important operating facts can be established by examining Table 1. For example, the magnetic field strength B at a distance of 50 cm from the solenoid is still sufficiently strong to pull the liquefied oxygen out of the chamber with an initial acceleration of 1.50 g (14.72 m/sec$^2$). However, the magnetic field is too weak to give the liquefied oxygen any significant magnetization while at rest inside the chamber. The magnetization M occurs while the fluid moves through the conduit and subjected to the external magnetic field with increasing intensity. It reaches its maximum magnetization when it passes into the bore where the field B has maximum intensity equal to 30 T.

The motion through the conduit is designed to achieve isothermal magnetization. This will result in the reduction of the entropy of the fluid inside the solenoid 18 but not the temperature. The temperature reduction occurs when the magnetic field of the solenoid is turned off This will produce the magnetocaloric effect that reduces the temperature of the fluid below the initial temperature $T_1$ (56° K.) to $T_2=T_1-\Delta T_m=54.61°$ K. By constructing the central conduit 14 with a metallic material having high thermal conductivity that is non-magnetic such as copper or aluminum, the heat loss of the liquefied oxygen 28 inside the bore of the solenoid 18 is transferred to the conduit 14 which becomes the primary stationary cooling surface. As shown in FIG. 3, a secondary heat transfer tube 30 is wound around the cooling conduit 14 and in thermal contact with it. The entire assembly is thermally insulated from the environment. By feeding vapor discharged from a cryogenic engine into the secondary coil 30, the cooling effect of the demagnetized liquid oxygen cools and liquefies the vapor. The cooling potential can be increased to extract any amount of heat from the vapor desired (within the operating limits) by simply repeating the above steps. If the oxygen makes R passes through the conduit per minute (repetition rate), the system will be able to absorb heat (cooling power) $\dot{Q}_C$ J/(gm minute), given by $$\dot{Q}_C = RQ_m = 2.31679R \text{ J/(gm minute)} \tag{18}$$

In order to achieve this continuous magnetic cooling effect at cryogenic temperatures, the central conduit 14 (which will be referred to as the primary heat transfer conduit) will be designed as a closed loop. In particular, it will be designed as a polygon with superconducting solenoids mounted at the vertices. And, in order to increase the cooling potential of the system, several superconducting solenoids will be mounted along the sides and operated simultaneously. These are the basic operating principles and operating parameters of the preferred embodiment of the magnetic condensing system. The detailed design of the preferred embodiment will now be presented.

In the preferred embodiment the central conduit forms a closed hexagonal loop with 12 superconducting solenoids with six separate portions of liquified oxygen that move intermittently around the loop simultaneously in the same direction. This will enable the magnetic condenser to continuously condense much more vapor. It will be specifically designed for cryogenic engines capable of generating a continuous power output of 25 KW (33.5 HP) with the capability of generating bursts of power exceeding 300 KW (403 HP) for several minutes for propelling standard size automobiles or vans.

In order to design the magnetic condenser that will be capable of condensing expanded vapor discharged from a cryogenic engine at the required mass flow rate, it will be necessary to determine the power output of a cryogenic engine corresponding to various mass flow rates. The cryogenic working fluid used in the engine will be assumed to be nitrogen.

Figure 4:
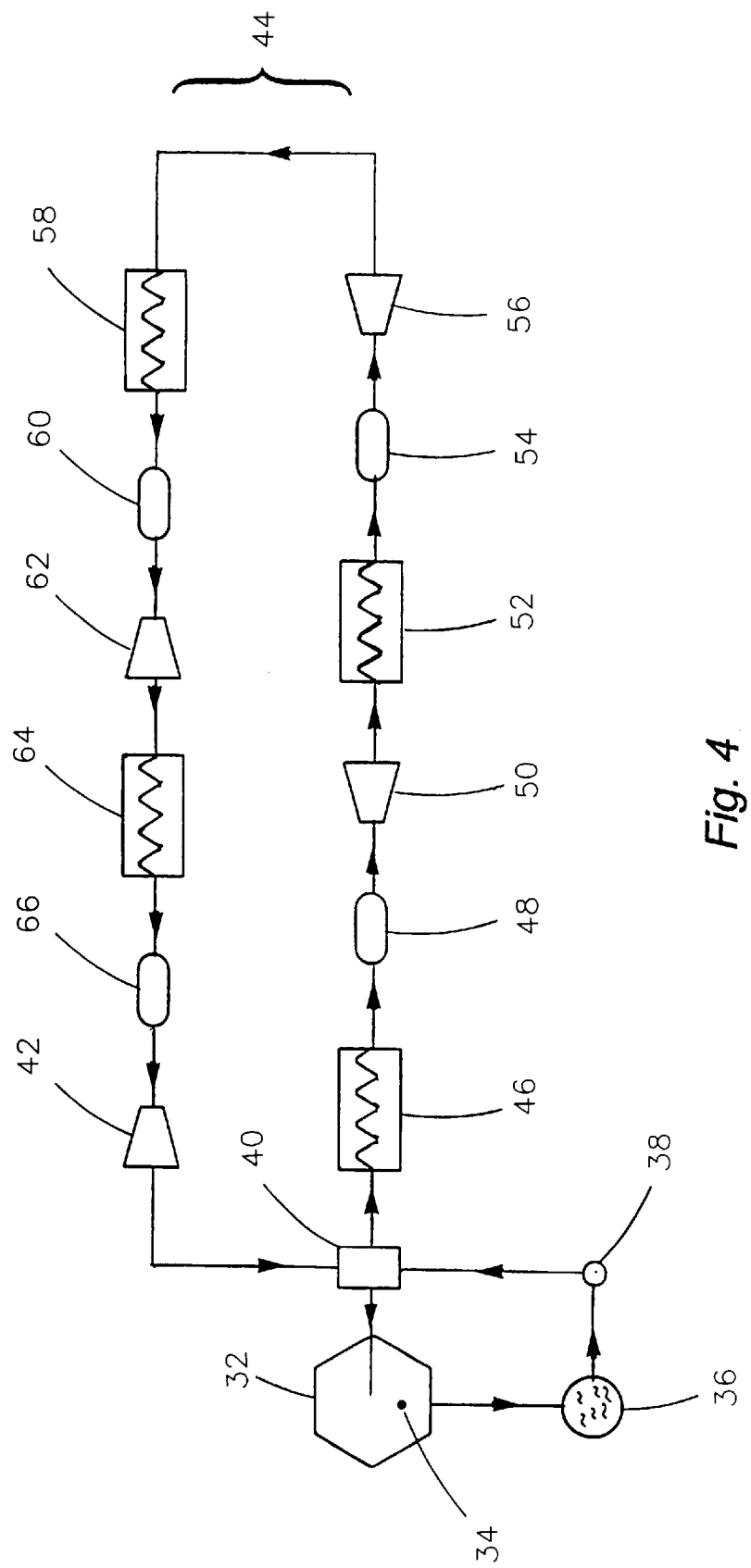
FIG. 4 is a block diagram of a cryogenic engine using the preferred embodiment of the magnetic condensing system.

FIG. 4 is a schematic block diagram of the cryogenic engine designed for automobiles used in the preferred embodiment of the magnetic condensing system. The determination of the thermodynamic parameters of the engine at various flow points will be based on accurate thermodynamic data published in the paper, "Thermodynamic Properties Of Nitrogen", *Journal of Physical Chemistry Ref. Data*, Vol. 2, No. 4, 1973, by Richard G. Jacobson and Richard B. Stewart. Referring to FIG. 4, saturated liquefied nitrogen leaving the condensing tubes of the magnetic condenser 32 will have the following values for the thermodynamic state parameters: $T_{NO}=76°$ K., Entropy $S_{NO}=2.803$ J/gm K, Enthalpy $H_{NO}=-124.221$ J/gm, $P_{NO}=1.0$ Bar (The values of these parameters are taken directly from the cited reference and based on the zero points used in that reference.) This liquefied nitrogen is then fed into a small isentropic compressor 34 and pressurized to 2.0 Bar. (The thermodynamic state parameters are essentially unchanged.) It is then circulated as cryogenic coolant for the superconducting solenoids, current switching system, and other components inside the magnetic condensing system 32. Since the passive multilayer cryogenic thermal insulation around the magnetic condenser 32 is designed to keep the heat leaks from the environment to a minimum, the heat absorbed by the circulating liquefied nitrogen will not be very great. Thus, it can be assumed that after circulating as coolant for the various components inside the magnetic condenser 32, the liquid emerges with a temperature increase of 6° K. The thermodynamic state parameters of the liquefied nitrogen after circulating around the various components of the magnetic condenser as coolant are: $T_{N1}=82°$ K., $S_{N1}=2.959$ J/gm K, $H_{N1}=-111.736$ J/gm, $P_{N1}=2.0$ Bar. The cryogenic fluid is then fed into a thermally insulated 10 gallon (37.85 liter) cryogenic storage vessel 36. The liquid nitrogen is then withdrawn from the storage vessel 36 and fed into a cryogenic hydraulic compressor 38 and isentropically compressed to a pressure of 600 Bar (8,702 lbs/in$^2$). After this isentropic compression, the thermodynamic state parameters are: $T_{N2}=96.186°$ K., $S_{N2}=2.959$ J/gm K, $H_{N2}=-38.975$ J/gm, $P_{N}2=600$ Bar. Consequently, the amount of specific mechanical work $\hat{W}_c$ consumed in this compression is $H_{N2}-H_{N1}=72.761$ J/gm. (Specific mechanical work refers to a mass flow of 1.0 gm and will be denoted by the symbol $\hat{W}$.)

After leaving the compressor 38 at 96.186° K. the liquefied nitrogen is fed into a low temperature, thermally insulated heat exchanger 40 where it serves as a coolant for cooling the vapor discharged from the last expander 42 of the cryogenic engine 44 before this vapor is fed into the magnetic condenser 32. The compressed liquefied nitrogen leaves the low temperature heat exchanger 40 with thermodynamic state parameters equal to: $T_{N3}=125.756°$ K., $S_{N3}=3.412$ J/gm K, $H_{N3}=11.019$ J/gm, $P_{N3}=600.0$ Bar. (The calculation of these parameters was based on the assumption that the mass flow rate of the liquid coolant entering the low temperature heat exchanger 40 at a temperature $T_{N2}=96.186°$ K. and enthalpy $H_{N2}=-38.975$ J/gm is the same as the mass flow rate of the vapor entering the heat exchanger 40 at a temperature $T_{N11}=173.47°$ K. and enthalpy $H_{N11}=179.336$ J/gm with its thermodynamic parameters equal to the parameters of the expanded vapor discharged from the last expander 42, and the assumption that the temperature of these two components leaving the heat exchanger 40 are the same. Since the amount of heat absorbed by the liquid nitrogen is equal to the heat loss by the vapor, the outlet temperature is calculated as being 125.756° K.) The amount of heat energy $\Delta Q$ absorbed in the low temperature heat exchanger 40 from the vapor is $H_{N3}-H_{N2}=49.994$ J/gm. After circulating through the low temperature heat exchanger 40, the compressed liquefied nitrogen is fed into the first ambient heat exchanger 46 where it is isobarically heated to ambient temperature which will be assumed to be 290° K. (62.3° F.). This heat exchanger 46 is maintained in thermal contact with ordinary atmospheric air at ambient temperature that is continuously flowing over the heating surfaces of the heat exchanger 46 with a mass flow rate many times greater than that of the compressed nitrogen circulating through it due to the vehicle's motion. Thus, the outlet temperature of all ambient heat exchangers can be assumed to be equal to ambient temperature. The heat exchanger 46 could be mounted under the front hood of the vehicle. Since the temperature of the compressed liquefied nitrogen entering the first ambient heat exchanger 46 is significantly below that of the flowing air stream, the thermal gradient across its thermal surfaces is very large and thus the cryogenic nitrogen extracts the natural thermal energy from the air stream at a rapid rate. Therefore, the compressed nitrogen is rapidly heated above its critical temperature (126.200° K.) and vaporized to become a pressurized gas at a pressure of 600 Bar (8,702 lbs/in$^2$) which is superheated to 290° K. The pressurized superheated nitrogen leaves the first heat exchanger 46 with its thermodynamic state parameters equal to: $T_{N4}$=290.0° K., $S_{N4}$=4.711 J/gm K, $H_{N4}$=262.742 J/gm, $P_{N4}$=600.0 Bar.

The amount of natural thermal energy $\hat{Q}_{N1}$ absorbed from the atmosphere while circulating through the first ambient heat exchanger 46 is $H_{N4}-H_{N3}$=251.723 J/gm.

Upon leaving the first heat exchanger 46 (FIG. 4) the superheated pressurized nitrogen is fed into a load-leveling high-pressure storage vessel 48 (energy storage system). This vessel 48 is also designed to be in thermal contact with atmospheric air at ambient temperature. The compressed gas is withdrawn from this storage vessel 48 and fed into the first cascading isentropic expander 50 where it is isentropically expanded down to a pressure of 120 Bar (1,740 lbs/in$^2$). The resulting thermodynamic state parameters are: $T_{N5}$=191.917° K., $S_{N5}$=4.711 J/gm K, $H_{N5}$=136.106 J/gm, $P_{N5}$=120 Bar. The mechanical work $\hat{W}_{N1}$ generated from this first expansion is equal to $\hat{W}_{N1}=H_{N4}-H_{N5}$=126.636 J/gm.

The expanded nitrogen leaving the first nitrogen expander 50 at 191.917° K. is fed into the second ambient heat exchanger 52 that is also maintained in thermal contact with a stream of atmospheric air at ambient temperature. The compressed nitrogen at 120 Bar is circulated through this second ambient heat exchanger 52 where it extracts and absorbs a considerable amount of additional natural thermal energy from the atmosphere. Thus, the nitrogen is isobarically reheated back to 290° K. and emerges from the second ambient heat exchanger 52 as a superheated compressed gas. The thermodynamic state parameters of the compressed superheated nitrogen are: $T_{N6}$=290° K., $S_{N6}$=5.310 J/gm K, $H_{N6}$=276.378 J/gm, $P_{N6}$=120 Bar.

The amount of natural thermal energy $\hat{Q}_{N2}$ absorbed from the atmosphere while circulating through the second ambient heat exchanger 52 is $H_{N6}-H_{N5}$=140.272 J/gm.

After leaving the second ambient heat exchanger 52, the superheated pressurized nitrogen is fed into a second load-leveling energy storage vessel 54 that is also maintained in thermal contact with flowing atmospheric air. The high pressure nitrogen gas is withdrawn from this storage vessel 54 and fed into the second isentropic expander 56 where it is expanded down to a pressure of 25 Bar (362.60 lb/in$^2$). The resulting thermodynamic state parameters are: $T_{N7}$=181.630° K., $S_{N7}$=5.310 J/gm K, $H_{N7}$=173.397 J/m $P_{N7}$=25 Bar. The specific mechanical work $\hat{W}_{N2}$ generated from this second isentropic expansion is $\hat{W}_{N2}=H_{N6}-H_{N7}$=102.981 J/gm.

The expanded nitrogen leaving the second isentropic expander 56 at 181.630° K. is fed into the third ambient heat exchanger 58 that is also maintained in thermal contact with atmospheric air at ambient temperature. The compressed nitrogen at 25 Bar is circulated through this third nitrogen heat exchanger 58 where it extracts and absorbs a considerable amount of additional natural thermal energy from the atmosphere. Thus, the nitrogen is isobarically reheated back to 290° K. and emerges from the third heat exchanger 58 as a superheated compressed gas at a pressure of 25 Bar (362.594 lbs/m$^2$). The thermodynamic state parameters of the compressed superheated nitrogen are: $T_{N8}$=290° K, $S_{N8}$=5.838 J/gm K, $H_{N8}$=295.141 J/gm, $P_{N8}$=25 Bar.

The amount of natural thermal energy $\hat{Q}_{N3}$ absorbed from the atmosphere while circulating through the third ambient heat exchanger 58 is $H_{N8}-H_{N7}$=121.744 J/gm.

After leaving the third ambient heat exchanger 58, the superheated pressurized nitrogen is fed into the third load-leveling energy storage vessel 60 that is also maintained in thermal contact with the atmosphere at ambient temperature. The compressed nitrogen gas is withdrawn from this vessel 60 and fed into the third isentropic expander 62 where it is expanded down to a pressure of 6 Bar (87.02 lb/in$^2$). The resulting thermodynamic state parameters are: $T_{N9}$=191.731° K., $S_{N9}$=5.838 J/gm K, $H_{N9}$=195.749 J/gm, $P_{N9}$=6 Bar. The specific mechanical work $\hat{W}_{N3}$ generated from this third isentropic expansion is $\hat{W}_{N3}=H_{N8}-H_{N9}$=99.392 J/gm.

The expanded nitrogen leaving the third expander 62 at 191.731° K. is fed into the fourth ambient heat exchanger 64 that is also maintained in thermal contact with another stream of air at ambient temperature. The compressed nitrogen at 6 Bar is circulated through this fourth heat exchanger 64 where it extracts and absorbs still more natural thermal energy from the atmosphere. Thus, the nitrogen is isobarically reheated back to 290° K. and emerges from the fourth heat exchanger 64 as a superheated compressed gas. The thermodynamic state parameters of the compressed superheated nitrogen are: $T_{N10}$=290° K., $S_{N10}$=6.275 J/gm K, $H_{N10}$=299.560 J/gm, $P_{N10}$=6 Bar.

The amount of natural thermal energy $\hat{Q}_{N4}$ absorbed from the atmosphere while circulating through the fourth ambient heat exchanger 64 is $H_{N10}-H_{N9}$=103.811 J/gm.

After leaving the fourth ambient heat exchanger 64, the superheated pressurized nitrogen is deposited into the fourth load leveling compressed gas energy storage vessel 66 that is also maintained in thermal contact with the atmosphere at ambient temperature. The gas in the fourth energy storage vessel 66 is fed into the fourth isentropic expander 42 where it is expanded down to a pressure of 1.000 Bar. The resulting thermodynamic state parameters are: $T_{N11}$=173.47° K., $S_{N11}$=6.275 J/gm K, $H_{N11}$=179.336 J/gm, $P_{N11}$=1.000 Bar. The specific mechanical work $\hat{W}_{N4}$ generated from this fourth isentropic expansion is $W_{N4}=H_{N10}-H_{N11}$=120.224 J/gm.

Upon leaving the fourth expander 42 at a temperature of 173.47° K., the nitrogen vapor is fed into the thermally insulated low temperature heat exchanger 40 where it is isobarically cooled down to 125.756° K. by the liquefied nitrogen leaving the hydraulic compressor 38. The thermodynamic state parameters leaving the low temperature heat exchanger 40 are: $T_{N12}$=125.756° K., $S_{N12}$=5.938 J/gm K, $H_{N12}$=129.302, $P_{N12}$=1.0 Bar. The vapor is then fed into the magnetic condenser 32 where it is cooled down to 76° K. and liquefied. The amount of thermal energy $Q_E$ that must be extracted in the magnetic condenser 32 to achieve this liquefaction is $$Q_E = H_{N12} - H_{N0} = 253.523 \text{ J/gm}. \tag{19}$$

The operating principles of the magnetic condenser are beautiful because this heat $Q_E$ is absorbed in the condenser by using the demagnetization process to create the resulting heat of magnetization that is equal to $Q_E$ which is converted into mechanical work by the rotating turbines and used to cancel out the current losses in the condenser's superconducting solenoids due to the inductive coupling of the magnetic dipoles in the paramagnetic oxygen. Thus, in order for the condenser to absorb this heat energy $Q_E$, it must be capable of generating a continuous heat sink where the total heat of magnetization is equal to $Q_E$. The design and dimensions of the preferred embodiment of the magnetic condenser are based upon this requirement which has been quantitatively determined in the above thermodynamic analysis of the cryogenic engine and expressed by equation (19).

The total amount of specific mechanical work $\hat{W}_N$ generated by the cryogenic engine is $$\hat{W}_N = \hat{W}_{N1} + \hat{W}_{N2} + \hat{W}_{N3} + \hat{W}_{N4} = 449.233 \ J/gm.$$

Therefore, the net specific output work generated by the cryogenic engine is $$\hat{W}_{NET} = \hat{W}_N - \hat{W}_C = 376.472 \ J/gm. \quad (20)$$

If $\dot{m}$ denotes the rate of mass flow (gm/sec) through the cryogenic engine, the output power P(Watts) is $$P = \dot{m}\hat{W}_{NET} \quad (21)$$

The total amount of natural thermal energy that the nitrogen working fluid absorbed from the atmosphere while circulating through the four ambient heat exchangers is $$\hat{Q}_N = \hat{Q}_{N1} + \hat{Q}_{N2} + \hat{Q}_{N3} + \hat{Q}_{N4} = 617.550 \ J/gm$$

Hence, the thermal efficiency $\eta$ of the cryogenic engine is $$\eta = \frac{\hat{W}_{NET}}{\hat{Q}_N} = 0.610$$

Since the thermal efficiency of large multi-megawatt prior art conventional condensing heat engines with maximum temperatures of about 1,100° F. is only about 0.40, the efficiency of the condensing cryogenic engine is significantly higher. And, most importantly, the cryogenic engine burns no fuel, generates no exhaust products, and generates no sound.

It is interesting to determine the required boiler temperature $T_H$ of the most efficient prior art condensing heat engine that will give the same thermal efficiency as the condensing cryogenic engine assuming that the expanded water vapor temperature $T_L$=150° F. (338.72° K.) which is the usual temperature. Since the most efficient prior art cyclic heat engine is a Carnot engine with Carnot efficiency $$\eta_C = \frac{T_H - T_L}{T_H}$$

the required boiler temperature $T_H$ would have to be 867.67° K. or 1,102.12° F. But Carnot engines are theoretical idealized engines that are not constructable. Thus, the prior art high temperature heat reservoir would have to be well over 2,000° F. to match the same efficiency as the cryogenic engine. But temperatures this high are also beyond engineering feasibility for large-scale power plants.

Table 2 gives the total net output power of the condensing cryogenic engine corresponding to various steady state (i.e., continuous) nitrogen mass flow rates that, baring mechanical breakdown, could continue generating the power indefinitely without any fuel cost. The required thermal power $\dot{m}Q_E$ that must be absorbed in the magnetic condenser $\dot{Q}_C$ given by equation (18) in order to re-condense the vapor, obtained by equation (19), corresponding to the various mass flow rates is also given.

TABLE 2

Total Output Power P of the Cryogenic Engine and the Required Thermal Power $\dot{m}Q_E$(KW) that must be Absorbed by the Magnetic Condenser to Achieve Liquefaction (Cyclic Operation) Corresponding to a Nitrogen Mass Flow Rate $\dot{m}$

| $\dot{m}_N$(gm/sec) | $\dot{m}Q_E$(KW) | P(KW) | P(HP) |
|---|---|---|---|
| 10 | 2.535 | 3.765 | 5.052 |
| 20 | 5.070 | 7.529 | 10.104 |
| 30 | 7.605 | 11.294 | 15.156 |
| 40 | 10.141 | 15.059 | 20.208 |
| 50 | 12.676 | 18.824 | 25.259 |
| 60 | 15.211 | 22.588 | 30.311 |
| 70 | 17.747 | 26.353 | 35.363 |
| 80 | 20.282 | 30.118 | 40.415 |
| 90 | 22.817 | 33.882 | 45.467 |
| 100 | 25.352 | 37.647 | 50.519 |
| 200 | 50.705 | 75.294 | 101.038 |
| 300 | 76.057 | 112.942 | 151.556 |
| 400 | 101.409 | 150.589 | 202.075 |
| 500 | 126.762 | 188.236 | 252.594 |
| 600 | 152.114 | 225.883 | 303.112 |
| 700 | 177.466 | 263.530 | 353.631 |
| 800 | 202.818 | 301.178 | 404.150 |
| 900 | 228.171 | 338.825 | 454.669 |
| 1,000 | 253.523 | 376.472 | 505.188 |

This table illustrates the very high-performance capabilities of the cryogenic engine that is operated cyclically by the magnetic condensing system. Since the amount of propulsive power required to maintain a speed of 60 mph on a level road for an aerodynamically streamlined six-passenger automobile is approximately 7 KW (9.4 HP), the power generated by the condensing cryogenic engine will be more than sufficient for propelling large size automobiles. (See the article, "Propulsion Technology: An Overview," *Automotive Engineering*, Vol. 100, No, 7, July 1992, pp. 29–33.) Bursts of accelerating power several times greater than the steady-state power given in Table 2 will be possible by withdrawing the compressed gas from the energy storage vessels 48, 54, 60, 66 and feeding it into the four expanders 50, 56, 62, 42, at higher mass flow rates. Regenerative braking is achieved by converting the vehicle's kinetic energy into compressed gas energy by using the torque from the drive shaft to re-compress the nitrogen gas in storage vessel 54 from 120 Bar back to 600 Bar and returning it to storage vessel 48 via a braking isentropic compressor, by re-compressing the nitrogen gas in storage vessel 60 from 25 Bar back to 120 Bar and returning it to storage vessel 54 via a second braking isentropic compressor, and by re-compressing the nitrogen gas in storage vessel 66 from 6 Bar back to 25 Bars and returning it to storage vessel 60 via a third braking isentropic compressor.

Table 2 also illustrates that the net power output will be sufficient for generating electricity, propelling boats, road vehicles, trains, and large propeller-driven commercial airliners. Since condensing cryogenic engines operate without consuming any fuel they will provide an ideal, lightweight, power source for propelling propeller driven aircraft. It will give all vehicles propelled by this system unlimited range.

Figure 5:
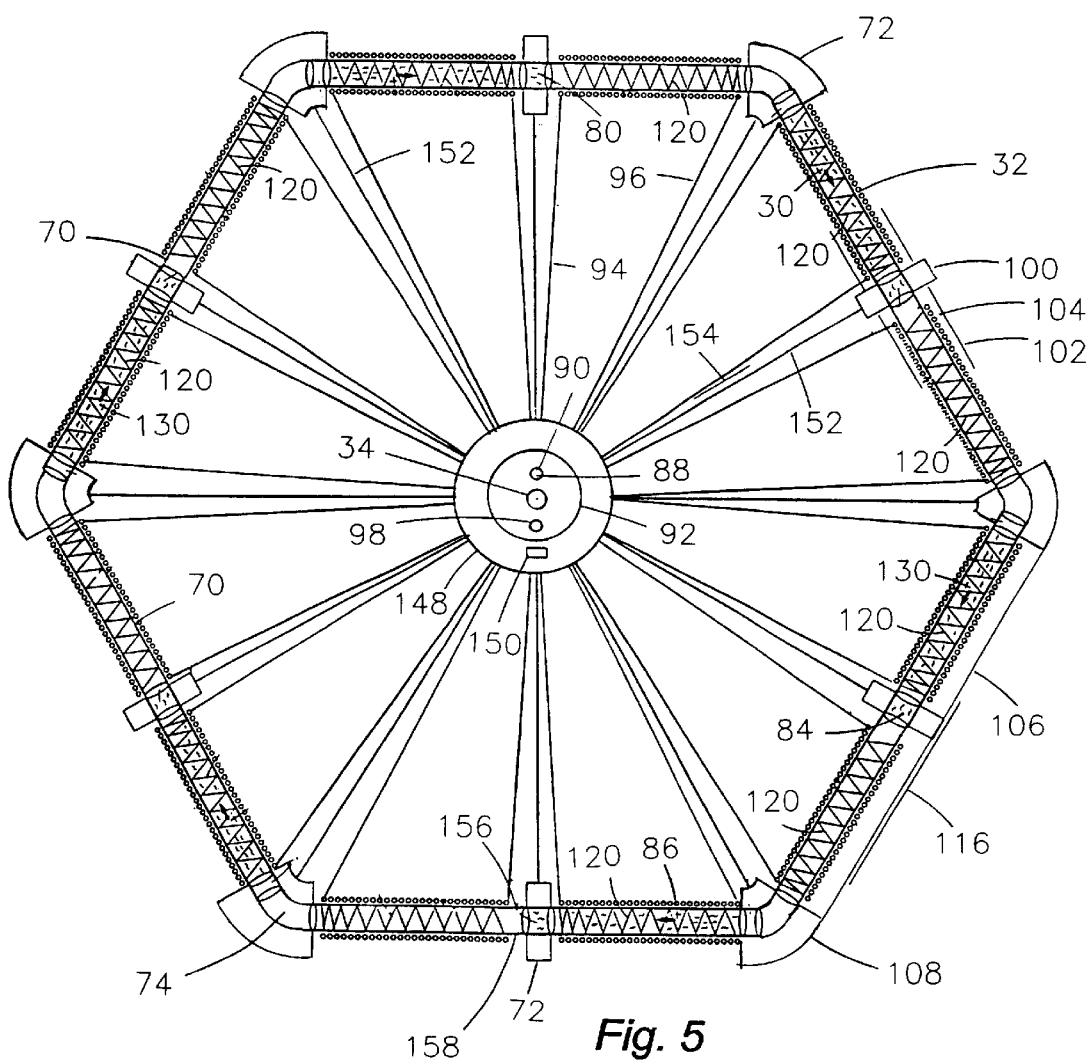
FIG. 5 is a schematic perspective plan view of the preferred embodiment of the magnetic condensing system illustrating its overall design and construction.

FIG. 5 is a schematic perspective plan view of the preferred embodiment of the magnetic condensing system 32 specifically designed for condensing the vapor discharged from the cryogenic engine 44 described above for propelling automobiles illustrating its design and construction. As is illustrated in this figure, the central primary heat transfer conduit 70 is designed as a closed hexagonal loop with superconducting solenoids 72 mounted at each vertex 74 and at the mid-sections of each side. Thus, there are 12 superconducting solenoids 72 mounted around the primary heat transfer conduit 70. The system is designed such that the liquefied oxygen moves through this conduit 70 in a clockwise direction. The hexagonal primary conduit 70 is made of copper to give it high thermal conductivity. (Copper is non-magnetic and is not effected by magnetic fields.) Each solenoid 72 is fitted with two, one-way doors 76 (FIG. 7) mounted on each end of the bores 78 thereby providing sealed chambers 80 inside each solenoid. The doors 76 are opened and closed by electrically energized, fast-acting, computer controlled actuators 82.

Since the cooling generated by the magnetic condenser occurs within the liquefied oxygen 84 inside the chambers 80 when the liquefied oxygen 84 undergoes demagnetization which occurs when the charged solenoids are discharged, the condensing tubes are designed as comprising twelve individual tubes 86 wound around the primary conduit 70 between each solenoid 72. The incoming vapor 88 discharged from the low-temperature heat exchanger 40 is fed into the magnetic condenser 32 via an inlet conduit 90 and divided into 12 equal streams with equal mass flows by a central distributer 92. Thermally insulated feeding conduits 94 carry the vapor 88 from the distributing system 92 to each of the twelve condensing tubes 86. These condensing tubes 86 are also made of copper and are tightly wound around the primary heat transfer conduit 70 as helical coils 86 in thermal contact with the central heat transfer conduit 70. The vapor 88 is cooled by passing through the condensing coils 86 and emerges as liquefied nitrogen at 76° K. After circulating through the condensing coils 86, the liquefied nitrogen is fed into thermally insulated return conduits 96 which are connected to the liquefied nitrogen outlet conduit 98. The liquefied nitrogen is then fed into the low pressure isentropic compressor 34 (FIG. 4), compressed to 2.0 Bar, and circulated around the various components of the magnetic condenser as cryogenic coolant before leaving the condenser 32.

The superconducting solenoids 72 will have maximum magnetic fields of 30 T. The physical dimensions are: outside diameter =30 cm (11.8 in), inside bore diameter =10.4 cm (4.09 in), and the length (thickness) of the solenoids 100 mounted at the mid-points of the straight sections of the hexagonal primary conduit 70, will be taken to be 15 cm (4.7 in). (The detailed design and construction of high-field superconducting solenoids is described in the article, "Advanced High-Field Coil Designs: 20 Tesla," *Advances in Cryogenic Engineering*, Vol. 29, pp. 57–66, by R. Hoard et al.) The solenoids 72 in the preferred embodiment are designed such that the magnetic field gradient on one side is slightly different from the field gradient on the other side. This is obtained by concentrating more superconductor on one side of the solenoid. This will result in generating more magnetic attractive force on one side than on the other so that the liquefied oxygen will be forced to move around the hexagonal central conduit 70 in a clockwise direction. The solenoids 72 are also fitted with cylindrical tube sections 102 on each side made of soft iron which confine the magnetic fields generated by the solenoids to relatively small regions 104 that envelop the central conduit 70. A plurality of thermally insulated support struts 106 connect all the solenoids together in a rigid mounting structure which also supports the hexagonal heat transfer conduit 70 that passes through each solenoid 72.

The inside diameter of the primary heat transfer conduit 70 that passes through the solenoids 100 mounted at the mid-points of each side of the primary conduit sections is 10 cm.(3.94 in). Thus, the chambers 80 inside these bores will have a volume V=1,178.097 cm$^3$. The other solenoids 108 mounted around the vertices of the primary conduit 70 are curved but designed to have the same inside chamber volume V. The superconductor 110 of the solenoids 72 is constructed with high-temperature superconducting wires such that the cryogenic coolant 112 circulating in double-walled cryogenic thermal shields 114 around each solenoid 72 is liquefied nitrogen at a temperature of 77° K. which is obtained from the condensing coils 86. (See "Critical Current Properties Under High Magnetic Fields Up To 30 T For Y—Ba—Cu—O Films By MOCVD", *IEEE Transactions On Mametics*, Vol. 27, No. 2, March 1991, by S. Matsuno et al.)

Each side of the hexagonal primary heat transfer conduit 70 has a length of 100 cm (39.37 in). Hence, the length (see FIG. 5) of the hexagonal primary heat transfer conduit 70 (measured from the center of the conduit) is 200 cm (78.74 in or 6.56 ft) and the width is 173.21 cm (68.16 in or 5.69 ft). Since the outside diameter of the solenoids 72 is 30 cm, the outside length between opposite solenoids is 230 cm (90.55 in or 7.54 ft) and the width is 203.21 cm (80.00 in or 6.67 ft). When the multilayer cryogenic thermal insulation 116 and the double wall thermal shield 114 is added, the total outside length of the magnetic condenser 32 will be approximately 232 cm (91.34 in or 7.61 ft) and the total outside width will be about 205.21 cm (80.79 in or 6.73 ft). The overall outside thickness including the thermal insulation 116 will be about 35 cm (13.78 in or 1.15 ft). These overall dimensions will enable the magnetic condensing system 32 to be installed under the chassis of an automobile 118 (or van) as illustrated in FIG. 6. Thus, the seats will be about one foot higher than in conventional automobiles.

FIG. 7 is an enlarged longitudinal perspective view of the primary heat transfer conduit 70 between two adjacent solenoids 72 illustrating the design and construction of the magnetic energy turbines 120 mounted inside. There are a total of 12 such turbines 120 mounted inside the primary heat transfer conduit 70 as shown in FIG. 5. They are constructed with a non-magnet material such as plastic or fiberglass composite material. They are supported inside the conduit 70 by a system of rotating circular sleeve rings 122 with flanges 124 that fit into slots 126 mounted inside the wall of the stationary primary conduit 70. FIG. 8 is an enlarged transverse cross-sectional view further illustrating the design and construction of the supporting sleeves 122. As shown in FIG. 7, the twisting (spiraling) shape of the turbine blades 128 have an increasing pitch so that the liquid oxygen 130 flowing inside the conduit 70 from the discharged solenoid 132 to the charged solenoid 134 through the turbine 120 under the strong magnetic attractive forces of the charged solenoid 134 will decelerate the liquefied oxygen 130 as the liquefied oxygen 130 approaches the charged solenoid 134 such that the liquefied oxygen has very little translational velocity as it enters the bore 136 of the charged solenoid 134. Since the viscosity of liquefied oxygen at cryogenic temperature is among the lowest of all fluids, and therefore is an excellent cryogenic lubricant, it is possible to design the magnetic energy turbines 120 with very high efficiency. Essentially all of the directed kinetic energy of the liquefied oxygen pulled into the chamber 80 of the charged solenoid 134 by the magnetic attractive forces will be converted into mechanical work by the magnetic energy turbine 120. An electrical generator 138 converts the mechanical work generated by the turbine 120 into electric energy. The coupling system between the turbine 120 and generator 138 is illustrated in FIGS. 7 and 8. A system of groves 140, mounted on the external side of the rotating sleeves 122, that are rigidly connected to the rotating turbine 120, turn the driving wheel 142 with sprockets 144 that fit into the grooves 140. The driving wheel 142 is connected to the drive shaft 146 of the electric generator 138. The design thereby provides a means for transferring the mechanical work $\Delta H_m$ generated by the turbine 120 rotating inside the sealed primary conduit 70 to the electric generator 138 that is mounted outside the conduit 70.

The current is switched from the charged solenoids to the discharged solenoids via superconducting switching circuits 148 controlled by a central operating computer 150 (FIG. 5). The current is transferred from the solenoids and switching circuits 148 via superconducting conduits 152. Likewise, the current generated by the generators 138 is also fed into the current switching circuits 148 via electrical conduits 154 which is also fed into the solenoids during the charging process. As described above, when the paramagnetic liquefied oxygen is pulled into a charged superconducting solenoid by the magnetic attractive forces, the energy comes from the inductive energy of the solenoid. This results in a slight decrease in the inductive energy of the solenoid that is manifested by a slight decrease in its current. The mechanism that causes this current loss is due to the inductive coupling between the magnetic dipoles in the liquid oxygen and the magnetic field of the charged solenoids. By feeding all of the current generated by the electric generator 138 back into the solenoid when it is being charged, the original inductive energy of the solenoid will always be restored to its initial value. This is accomplished by the switching circuits 148. The control computer 150 operates from control commands sent by the human operator of the engine and by various transducers 156 that monitor the thermodynamic parameters at various flow points 158 in the magnetic condenser 32 and in the cryogenic engine 44. The current switching system 148 is similar to prior art current switching circuits designed for superconducting motors but operate at a much lower frequency. Detailed designs of superconducting current switching circuits can be found in the following references: "Superconducting Motors" pages 115–131 in the book, *Superconductivity—The New Alchemy,* 1989 by John Langone; *Introduction To Superconducting Circuits,* John Wiley & Sons, Inc., 1999 by Alan M. Kadin; and *Superconducting Devices,* Academic Press, Inc., 1990, edited by Steven T. Ruggiero and David A Rudman.

Figure 9:
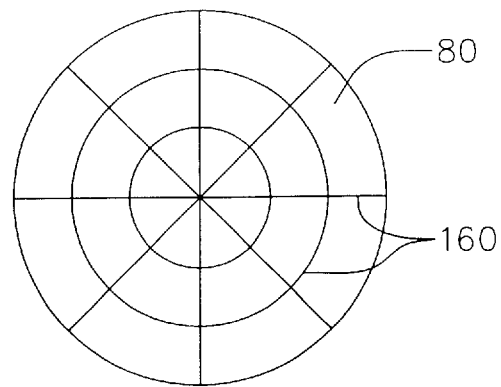
FIG. 9 is a schematic transverse cross-section through a cooling chamber of the magnetic condenser mounted inside the bore of a superconducting solenoid illustrating the design and construction of a plurality of heat transfer fins for increasing the thermal contact between the paramagnetic fluid that is magnetically cooled inside the chamber and the primary heat transfer tube.

The detailed operating parameters of the magnetic condenser operating by the magentocaloric effect corresponding to the preferred embodiment of the condenser are given in equations (8). By converting the kinetic energy of the liquid oxygen moving through the primary heat transfer conduit 70 pulled by the magnetic attractive forces of the charged superconducting solenoid 134, the liquid will enter the chamber 80 inside the bore 136 of the charged solenoid 134 where it reaches maximum magnetization with very little velocity. Thus, the liquid inside the chamber 80 is isothermally magnetized. The temperature of the liquid as it enters the chamber 80 is equal to the initial temperature $T_1=56°$ K. However, the initial entropy $S_1$ of the liquid oxygen inside the chamber 80 is reduced by an amount $\Delta S_m$ given by equation (1) due to dipole alignment with the magnetic field B by an amount $\Delta S_m$ given by equation (1). When the magnetic field B is turned off by transferring the current in the charged solenoid 134 to the upstream adjacent solenoid via the current switching circuit 148, the liquid oxygen becomes demagnetized and its temperature drops by an amount $\Delta T_m$ given by equation (4). Since this temperature drop is 1.394° K., the temperature becomes $T_2=T_1-\Delta T_m=54.606°$ K. Thus, the liquefied oxygen inside the chamber 80 becomes a heat sink for absorbing an amount of thermal energy $Q_m=C\Delta T_m=2.31679$ J/gm=heat of magnetization $\Delta H_m$. Since the density p of liquefied oxygen at 56° K. is 1.299 gm/cm³, the total amount of heat that the liquid oxygen inside the chamber 80 can absorb at temperature $T_1=56°$ K. without its temperature rising above 56° K. after the magnetic field is turned off is $pVQ_M=3,545.495$ J. This heat will be extracted from the vapor circulating around the primary heat transfer conduit 70 inside the condensing tube 86 at an initial temperature of 125.756° K. Since the difference in temperature is so great the heat transfer between the nitrogen vapor moving through the condensing tube 86 and the liquefied oxygen inside the chamber 80 is fairly rapid. In order to achieve a high rate of heat transfer between the nitrogen and the oxygen, the chamber 80 is fitted with a plurality of thin thermal surfaces 160 made of copper that extend longitudinally through the chamber 80 in thermal contact with the liquefied oxygen and primary heat transfer tube 70 as shown in FIG. 9. The mass flow rate of the nitrogen vapor entering the condensing tubes 86 at a pressure of 1.0 Bar is such that the temperature is reduced down to 76° K. where it becomes saturated, and is liquefied at this temperature by the extraction of additional thermal energy (heat of vaporization). As described above, incoming vapor is fed into twelve heat transfer condensing tubes 86 via the distributer 92. The heat loss in the liquified oxygen due the demagnetization effect is transferred to the primary heat transfer conduit 70 which is, in turn, transferred to the twelve heat transfer tubes (condensing tubes) 86 via the distributer 92. The mass flow rate m of the vapor 88 entering the magnetic condenser 32 is designed such that this heat loss is exactly equal to the heat extracted from the vapor $mQ_E$ given in equation (19). Since there are 6 portions of liquefied oxygen that undergo demagnetization simultaneously each time the current is switched from the charged solenoids to the discharged solenoids, and the current is switched R times per minute, the total amount of heat that is extracted from the incoming vapor per minute (cooling power) by the magentocaloric effect is given by the equation $$\dot{Q}_C = 6\rho VRQ_m = 21,272.974R \text{ Joules/min} \quad (22)$$

In the preferred embodiment, the magnetic condenser 32 is designed to enable the cryogenic engine to generate 25 KW of continuous output power. According to equations (20) and (21), the mass flow $\dot{m}$ of nitrogen that will generate 25 KW of continuous power is 66.406 gm/sec. Since the condenser has to extract $Q_E=253.523$ J of thermal energy (see equation (19)) to liquefy each gram, the magnetic condenser would have to generate a cooling power of $\dot{m}Q_E=66.406\times253.523=16,835.449$ Joules/sec=1.0101×10⁶ Joules per min. Consequently, the required repetition rate R can be calculated from the equation $$R = \frac{\dot{m}Q_E}{6\rho VQ_m} = 47.5$$

Hence, the time interval between the current switches is 1.26 sec. Since the time required for the liquefied oxygen to pass through the conduit sections from one solenoid to the adjacent solenoid will be less than 0.5 seconds, a repetition rate R=47.5 per minute will be well within the operating limits. (If the repetition rate R were less than 47.5, the temperature of the liquefied oxygen would begin rising above 56° K. because the heat loss generated by the magnetocaloric effect would be less than that required to liquefy the nitrogen vapor. If it were greater than 47.5, the temperature of the liquid oxygen would begin to fall below 56° K.) Since the temperature drop $\Delta T_m$ in the liquefied oxygen occurs almost instantaneously when the current is switched from one solenoid to the adjacent solenoid, the magnetic condenser could be operated at a much higher repetition rate R to generate a significantly higher cooling power. This would enable the cryogenic engine to be operated at a much higher mass flow rate $\dot{m}$ for generating a significantly higher level of continuous power. However, this is believed to be wasteful for aerodynamically streamlined automobiles since a steady power of 25 KW (33.5 HP) is much more than is required for canceling all drag forces at a speed of 65 mph. As explained above, the cryogenic engine will have the capability of generating bursts of accelerating power exceeding 300 KW (403 HP) that could be sustained for several minutes by increasing the mass flow into the four expanders while limiting the rate of mass flow $\dot{m}$ into the condenser to 66.406 gm/sec.

The above preferred embodiment of the magnetic condenser was specifically designed for automobiles propelled by cryogenic engines so that the cryogenic engines could be operated cyclically. However, much larger magnetic condensing systems can be designed for large propeller driven commercial aircraft. FIG. 10 describes a very large magnetic condensing system comprising several primary heat transfer conduits 162 with several hundred superconducting solenoids 164. For example, if the outer loop 166 has a rectangular shape that is 30 m (98.4 ft) long and 10 m (32.8 ft) wide, it could be easily mounted in the wings. Assuming that the total number of superconducting solenoids is 400 with inside diameters of 20 cm (7.87 in) and a length of 20 cm (7.9 in) giving chamber volumes V=6,283 cm³ it follows from equation (21) that the cooling power would be $\dot{Q}_C = 400\rho$ $VRQ_m = 7.564 \times 10^6$ RJ/min. If R=60 current switches/min, $\dot{Q}_C = 7.564 \times 10^6$ J/sec. Consequently, in view of equation (19), this cooling power will be able to condense expanded nitrogen vapor discharged from the low temperature heat exchanger 40 at the rate of 29,833 gm/sec. With this mass flow $\dot{m}$ it follows from equation (20) that the cryogenic engine described above would be able to generate a power of 11,232 KW (15,072 HP). Since a condensing cryogenic engine could be mounted in each wing, the total power that the aircraft could generate would be 22,464 KW (30,144 HP). This is more than twice the power generated by the huge Northrop flying wing with a wingspan of 173 ft. With all of this propulsive power available, the flying wing could be scaled up to a wingspan of 300 ft with enough payload for 500 passengers. However, unlike the reciprocating engines of the Northrop flying wing (B-35), the power plant described here uses no fuel, is lightweight, generates no exhaust products, is completely silent, and, barring mechanical breakdown, could keep the aircraft flying forever. The total amount of liquefied oxygen required to operate each magnetic condenser is 400 $\rho V = 3,263$ Kg (7,197 lbs). There would be less nitrogen because most of the nitrogen would be in the gaseous state. FIG. 11 is a schematic plan view illustrating a very large commercial aircraft 168 designed as a Northrop flying wing propelled by these condensing cryogenic engines 170 where one engine drives four propellers 172. Aircraft would be ideal vehicles for condensing cryogenic engines because high mass flows of atmospheric air passing over the ambient heat exchangers 174, that could be mounted in the wings, would provide huge amounts of natural thermal energy. Although the cruising speed would only be about 300 mph, it would have unlimited range and the fuel cost would be zero.

There are many other variations and modifications of the magnetic condensing system. For example, smaller magnetic condensing systems could be used with small cryogenic engines for generating both electricity and refrigeration for private homes. The system could also be used for many different applications besides condensers of cryogenic engines. For example, the magnetic condensing system shown In FIG. 5 could also be used for manufacturing liquid air directly from the atmosphere. By feeding in atmospheric air at ambient temperature and pressure into the inlet duct 90, liquefied air would be discharged from the outlet duct 98. Another embodiment could be designed to provide air conditioning (refrigeration) for homes in hot environments. In this embodiment, hot air from the interior of a building would be fed into the inlet duct 90, cooled by transferring heat to the paramagnetic fluid to some comfortable temperature, and discharged back into the building through the outlet duct 98. Another embodiment could be designed to provide refrigeration for food storage (i.e., refrigerators).

Other embodiments could be designed as condensing systems for very large cryogenic engines generating bulk electric power exceeding that of the largest nuclear plants. This could be achieved by increasing the diameter of the central conduit 70, and increasing the size of the superconducting solenoids 72. For example, by designing the condensing system in the form of 50 individual concentric primary conduit loops with an inside diameter of 50 cm, extending out to a radius of 500 m or more with 20,000 very large superconducting solenoids, a system of cryogenic engines extracting thermal energy from a large river could produce continuous power exceeding 5 GW.

Still other embodiments and variations of the basic invention are possible. For example, since nitric oxide (NO) is another gas that is naturally paramagnetic, the magnetic condensing system could also be designed using liquefied nitric oxide as the paramagnetic working fluid instead of liquid oxygen. It may also be possible to artificially create another liquefied gas that is more paramagnetic than liquid oxygen which could be used in the practice of this invention. The paramagnetic working fluid could also be a low temperature paramagnetic gas such as oxygen gas.

As various other changes and modifications can be made in the above method and apparatus for generating an artificial low temperature heat reservoir without departing from the spirit or scope of the invention, it is intended that all subject matter contained in the above description or shown in the accompanying drawings should be interpreted as illustrative and not in a limiting sense.

What is claimed is:

1. A method for generating a low temperature heat sink for absorbing thermal energy at sub-ambient temperature comprising the steps of:

isothermally magnetizing a paramagnetic fluid in the liquid or gaseous state at an initial temperature below ambient temperature of the natural environment thereby lowering the entropy of said paramagnetic substance;

demagnetizing said paramagnetic fluid at said initial sub-ambient temperature by turning off said magnetic field thereby achieving a temperature drop in said paramagnetic fluid to a temperature below said initial sub-ambient temperature due to the magentocaloric effect enabling said paramagnetic fluid to absorb heat at sub-ambient temperature; and repeating said isothermal magnetizing and demagnetizing steps thereby enabling said paramagnetic fluid to continuously absorb thermal energy below ambient temperature.

2. A method as set forth in claim 1 wherein said paramagnetic fluid is liquefied oxygen at cryogenic temperature.

3. A method as set forth in claim 1 wherein said step of isothermal magnetization comprises the steps of:
   placing said paramagnetic fluid in a chamber means in the vicinity of a current carrying coil means for generating a magnetic field;
   connecting said means for generating a magnetic field to said chamber means with a primary conduit means;
   mounting turbine means inside said primary conduit means between said coil means for generating said magnetic field and said chamber means;
   energizing said coil means for generating a magnetic field with electric current thereby creating a magnetic field inside said conduit means that attracts said paramagnetic fluid;
   releasing said paramagnetic fluid from said chamber means thereby enabling said fluid to accelerate through said conduit means toward said coil means with increasing kinetic energy and magnetization by virtue of said magnetic field thereby enabling heat of magnetization to appear in the form of kinetic energy of said paramagnetic fluid moving through said conduit means; and
   converting said kinetic energy of said paramagnetic fluid moving through said conduit means into mechanical work by said turbine means thereby achieving isothermal magnetization.

4. A method as set forth in claim 3 wherein said coil means for generating a magnetic field is a solenoid having a central bore and wherein said primary conduit means connects said bore to said chamber means thereby enabling said paramagnetic fluid to enter said bore by passing through said conduit means.

5. A method as set forth in claim 3 further comprising the step of converting said mechanical work generated by said turbine means into electrical energy.

6. A method as set forth in claim 3 wherein said coil means for generating a magnetic field is a superconducting solenoid having a central bore.

7. A method as set fourth in claim 3 wherein said primary conduit means is in thermal contact with said heat absorbing paramagnetic fluid further comprising the steps of:
   mounting a secondary conduit means in thermal contact with said primary conduit means; and
   condensing a non-condensed vapor at sub-ambient temperature by feeding said vapor into said secondary conduit means and transferring thermal energy from said vapor to said heat absorbing paramagnetic fluid.

8. A method as set fourth in claim 7 wherein said non-condensed vapor is vapor discharged from a cryogenic engine.

9. A method as set fourth in claim 6 wherein said chamber means is mounted inside the bore of a second superconducting solenoid that generates an initial magnetic field and wherein said demagnetizing step comprises turning off said magnetic field.

10. A method as set fourth in claim 6 further comprising the step of charging said superconducting solenoid by the step of transferring current from said second solenoid.

11. A method as set forth in claim 1 wherein said repetition step comprises the steps of:
   mounting a plurality of spaced-apart superconducting solenoids having central bores around a closed loop of primary conduit in thermal contact with said paramagnetic fluid passing through said bores;
   mounting non-magnetic turbine means inside said primary conduit between adjacent solenoids;
   mounting secondary conduit means around said primary conduit in thermal contact with said primary conduit;
   mounting chambers with sealing doors inside said bores communicating with said primary conduit;
   placing said paramagnetic fluid inside the chambers of alternating solenoids;
   charging said alternating superconducting solenoids containing said paramagnetic fluid with an initial current thereby creating magnetic fields and magnetizing said paramagnetic fluid;
   turning off the magnetic fields of said charged solenoids by transferring their current to the uncharged solenoids thereby demagnetizing said paramagnetic fluid and generating a temperature reduction in said paramagnetic fluid by said magentocaloric effect;
   opening said chamber doors holding said demagnetized paramagnetic fluid to enable said fluid to be re-magnetized by accelerating through said primary conduit toward the magnetic fields of the adjacent charged solenoids by magnetic attractive forces enabling the heat of magnetization to appear as kinetic energy;
   converting said kinetic energy into mechanical work via said turbines thereby achieving isothermal magnetization;
   feeding non-condensed vapor at sub-ambient temperature discharged from a cryogenic engine into said secondary conduit means thereby condensing said vapor at sub-ambient temperature by transferring heat energy to said paramagnetic fluid; and
   repeating said steps of transferring current from the charged solenoids to the uncharged solenoids and releasing the paramagnetic fluid to flow through said primary conduit in a repetitive process around said loop of primary conduit thereby creating said heat sink for absorbing thermal energy from said vapor flowing through said secondary conduit means.

12. A method as set forth in claim 11 wherein said condensed fluid discharged from said secondary conduit means is recycled back into said cryogenic engine thereby enabling said engine to operate cyclically.

13. A method for generating a low temperature heat sink for absorbing thermal energy at sub-ambient temperature comprising the steps of:
   magnetizing a paramagnetic fluid at an initial temperature below ambient temperature by subjecting said fluid to a magnetic field;
   converting the heat of magnetization of said paramagnetic fluid into mechanical work; and
   turning off said magnetic field thereby achieving a temperature drop in said paramagnetic fluid at sub-ambient temperature due to the magnetocaloric effect for absorbing heat at sub-ambient temperature.

14. A method for condensing vapor at sub-ambient temperature comprising the steps of:
   creating a magnetic field by energizing a superconducting solenoid having a central bore with current;
   placing a paramagnetic fluid with an initial sub-ambient temperature inside a chamber positioned some distance away from said superconducting solenoid;
   mounting conduit means on said chamber communicating with said bore of said superconducting solenoid;

magnetizing said paramagnetic fluid by releasing said fluid from said chamber thereby causing said fluid to flow through said conduit toward said superconducting solenoid by magnetic attractive forces thereby giving said fluid kinetic energy while simultaneously enabling said fluid to become magnetized by virtue of moving closer to said solenoid where said magnetic field is more intense and enabling the heat of magnetization to appear as said kinetic energy;

converting said kinetic energy into mechanical work by mounting a turbine means inside said conduit thereby converting said heat of magnetization into mechanical work;

demagnetizing said fluid by turning off said magnetic field thereby causing a temperature reduction in said fluid below said initial temperature by the magnetocaloric effect; and absorbing heat energy from said vapor at sub-ambient temperature by virtue of said temperature reduction.

15. A method for condensing vapor at sub-ambient temperature comprising the steps of:

isothermally magnetizing a paramagnetic fluid at an initial sub-ambient temperature by subjecting said paramagnetic fluid to a magnetic field;

demagnetizing said paramagnetic fluid by turning off said magnetic field thereby lowering the temperature of said paramagnetic fluid below said initial temperature; and absorbing heat of vaporization from said vapor at sub-ambient temperature by said paramagnetic fluid thereby condensing a portion of said vapor.

16. A method as set forth in claim 15 wherein said isothermal magnetizing step comprises the steps of:

subjecting said paramagnetic fluid to a magnetic field created by a source current located at a distance from said fluid such that said source current generates a magnetic field gradient that accelerates said fluid toward said source current where said field has maximum intensity thereby increasing the magnetization of said fluid while simultaneously giving said fluid directed kinetic energy as it accelerates along a path toward said source current, said kinetic energy representing heat of magnetization; and converting said directed kinetic energy into mechanical work by mounting a turbine means in the path of said motion such that said fluid arrives at said source current where it reaches maximum magnetization with essentially no increase in temperature.

17. A method for creating an artificial heat sink at sub-ambient temperature comprising the steps of:

accelerating a paramagnetic fluid with an initial sub-ambient temperature through a conduit means by magnetic attractive forces created by a magnetic field generated by a current source located at a distance thereby magnetizing said fluid as it moves toward said current source through said conduit means thereby enabling heat of magnetization to appear in the form of directed kinetic energy;

converting said directed kinetic energy into mechanical work by mounting a turbine means in said conduit means such that said fluid reaches said current source with essentially no increase in temperature thereby enabling said fluid to become magnetized essentially without any increase in temperature; and demagnetizing said fluid by turning off said magnetic field thereby lowering the temperature of said fluid below said initial sub-ambient temperature and enabling said fluid to become a heat sink for absorbing heat at sub-ambient temperature by repeating said steps.

18. A method for creating an artificial heat sink at sub-ambient temperature comprising the steps of:

creating a magnetic field in a primary conduit means by a current source;

mounting turbine means inside said primary conduit means;

feeding a paramagnetic fluid with an initial sub-ambient temperature into said primary conduit means such that said magnetic field accelerates said fluid toward said current source and becomes magnetized thereby enabling heat of magnetization to appear in the form of directed kinetic energy of said fluid accelerating through said primary conduit means as it becomes magnetized;

removing said heat of magnetization by converting said kinetic energy into mechanical work by said turbine means; and demagnetizing said magnetized paramagnetic fluid by turning off said magnetic field thereby lowering the temperature of said paramagnetic fluid below said initial sub-ambient temperature by the resulting magnetocaloric effect and enabling said paramagnetic fluid to become a heat sink for absorbing heat at sub-ambient temperature.

19. A method as set forth in claim 18 wherein said paramagnetic fluid is liquefied oxygen at cryogenic temperature.

20. A method as set forth in claim 18 further comprising the step of converting said mechanical work generated by said turbine means into electrical energy.

21. A method as set fourth in claim 18 wherein said primary conduit means is in thermal contact with said heat absorbing paramagnetic fluid further comprising the steps of:

mounting a secondary conduit means in thermal contact with said primary conduit means; and liquefying a non-condensed vapor at sub-ambient temperature by feeding said vapor into said secondary conduit means and transferring thermal energy to said paramagnetic fluid.

22. A method as set fourth in claim 21 wherein said non-condensed vapor is vapor discharged from a cryogenic engine further comprising the step of feeding said liquefied vapor at sub-ambient temperature back into said cryogenic engine thereby enabling said cryogenic engine to operate cyclically.

23. A method as set forth in claim 18 wherein said current source is a superconducting solenoid having a central bore communicating with said primary conduit means.

24. A method for generating an artificial sub-ambient heat sink for re-condensing vapor discharged from a cryogenic engine comprising the steps of:

mounting a plurality of spaced-apart superconducting solenoids having central bores around a closed loop of primary conduit such that said conduit passes through said bores;

mounting non-magnetic turbine means inside said primary conduit between adjacent solenoids;

mounting secondary conduit means around said primary conduit in thermal contact with said primary conduit;

mounting chambers with sealing doors inside said bores communicating with said primary conduit;

charging alternating superconducting solenoids with electric current;

isothermally magnetizing a paramagnetic fluid by introducing said fluid into said charged superconducting solenoids and converting the heat of magnetization into mechanical work;

demagnetizing said paramagnetic fluid by transferring the current of said charged superconducting solenoids to said alternating discharged solenoids with vacant bores thereby creating a temperature drop in said fluid by the resulting magnetocaloric effect, said temperature drop enabling said fluid to absorb heat at sub-ambient temperature from vapor passing through said secondary conduit means;

isothermally re-magnetizing said paramagnetic fluid by opening said chamber doors holding said demagnetized fluid thereby allowing said fluid to flow through said primary conduit into the magnetic fields of said charged superconducting solenoids by magnetic attractive forces and converting said heat of magnetization that appears as kinetic energy of said fluid moving through said primary conduit into mechanical work by said turbine means;

feeding non-condensed vapor at sub-ambient temperature discharged from a cryogenic engine into said secondary conduit means thereby liquefying said vapor at sub-ambient temperature by transferring heat energy to said paramagnetic fluid;

feeding said liquefied vapor back into said cryogenic engine; and repeating said steps of demagnetizing and isothermally re-magnetizing said paramagnetic fluid a repetitive process around said loop of primary conduit thereby creating said heat sink for absorbing thermal energy from said vapor flowing through said secondary conduit means by said magnetocaloric effect.

25. An apparatus for absorbing thermal energy at sub-ambient temperature comprising:

a paramagnetic fluid at an initial sub-ambient temperature;

coil means for generating a magnetic field;

means for isothermally magnetizing said paramagnetic fluid by subjecting said fluid to said magnetic field and removing the heat of magnetization thereby lowering the entropy of said fluid, said means comprising;

chamber means containing said paramagnetic fluid;

structural means for mounting said chamber means at a spaced-apart distance from said coil means;

a primary conduit means communicating between said chamber means and said coil means;

turbine means mounted inside said primary conduit means between said coil means and said chamber means;

means for energizing said coil means with electric current thereby creating a magnetic field inside said primary conduit means that attracts said paramagnetic fluid to said coil means by magnetic attractive forces;

means for releasing said paramagnetic fluid from said chamber means into said primary conduit means thereby enabling said fluid to accelerate through said primary conduit means toward said coil means where said magnetic field is more intense with increasing kinetic energy and increasing magnetization thereby enabling heat of magnetization to appear in the form of kinetic energy of said fluid moving through said primary conduit means;

means for converting said kinetic energy of said fluid moving through said primary conduit means into mechanical work by said turbine means thereby achieving said isothermal magnetization;

means for demagnetizing said fluid at said initial sub-ambient temperature thereby achieving a temperature drop in said paramagnetic fluid to a temperature below said initial sub-ambient temperature resulting from the magnetocaloric effect enabling said paramagnetic fluid to absorb heat at sub-ambient temperature;

means for repeating said isothermal magnetizing and demagnetizing steps thereby enabling said paramagnetic fluid to continuously absorb thermal energy below ambient temperature;

said coil means for generating said magnetic field is a superconducting solenoid having a central bore; and means for charging said superconducting solenoid, said means comprising means for transferring current into said solenoid from a second solenoid.

26. An apparatus as set forth in claim 25 wherein said means for repeating said isothermal magnetizing and demagnetizing steps comprises:

a central primary conduit forming a closed loop containing said paramagnetic fluid;

a plurality of spaced-apart superconducting solenoids having central bores mounted around said primary conduit with said conduit passing through said bores;

turbine means mounted inside said primary conduit between adjacent solenoids;

secondary conduit means mounted around said primary conduit in thermal contact with said primary conduit;

a plurality of chambers with sealing doors mounted inside said bores communicating with said primary conduit;

means for charging alternating superconducting solenoids with current thereby creating magnetic fields in said alternating solenoids;

means for introducing said paramagnetic fluid into the chambers of alternating solenoids having magnetic fields thereby magnetizing said fluid;

means for discharging said alternating superconducting solenoids containing said paramagnetic fluid by transferring their current to the uncharged adjacent solenoids thereby demagnetizing said paramagnetic fluid and generating a temperature reduction in said paramagnetic fluid by said magnetocaloric effect;

means for opening said chamber doors holding said demagnetized paramagnetic fluid to enable said fluid to be re-magnetized by accelerating through said primary conduit toward the magnetic fields of the adjacent charge solenoids by magnetic attractive forces thereby enabling the heat of magnetization to appear as kinetic energy;

means for converting said kinetic energy into mechanical work by said turbine means thereby achieving isothermal magnetization;

means for feeding non-condensed vapor at sub-ambient temperature discharged from a cryogenic engine into said secondary conduit means thereby condensing said vapor at sub-ambient temperature by transferring heat energy from said vapor to said paramagnetic fluid; and means for repeating said steps of transferring current from said charged solenoids to said uncharged solenoids and releasing said fluid to flow from one solenoid to another solenoid around the closed primary conduit loop by switching circuit means and means for opening and closing said doors thereby subjecting said paramagnetic fluid to a series of isothermal magnetization and demagnetization steps creating said heat sink for absorbing thermal energy from said vapor flowing through said secondary conduit means.

27. An apparatus as set forth in claim 26 wherein said liquefied fluid discharged from said secondary conduit means is recycled back into said cryogenic engine thereby enabling said engine to operate cyclically.

28. An apparatus for condensing vapor at sub-ambient temperature comprising:
 a superconducting solenoid having a central bore generating a magnetic field;
 chamber means with access door means containing a paramagnetic fluid at an initial sub-ambient temperature positioned some distance away from said superconducting solenoid;
 means for opening and closing said access door means;
 conduit means communicating with said chamber means and said bore of said superconducting solenoid to enable said paramagnetic fluid to flow from said chamber means into said bore by passing through said conduit means when said access door means is opened;
 turbine means mounted inside said conduit means between said chamber means
and said superconducting solenoid;
 means for magnetizing said paramagnetic fluid by opening said access door means thereby enabling said fluid to accelerate through said conduit means toward said superconducting solenoid by magnetic attractive forces generated by said superconducting solenoid thereby magnetizing said paramagnetic fluid by virtue of said fluid moving closer to said solenoid were said magnetic field is more intense and enabling the heat of magnetization to appear as directed kinetic energy of the fluid moving through said conduit means;
 means for converting said heat of magnetization into mechanical work by converting said directed kinetic energy of said fluid accelerating through said conduit means into mechanical work by said turbine means;
 means for discharging said superconducting solenoid;
 means for demagnetizing said paramagnetic fluid by discharging said superconducting solenoid thereby causing a temperature reduction in said fluid below said initial sub-ambient temperature by the magnetocaloric effect; and
 heat transfer means for extracting thermal energy from said vapor and absorbing said thermal energy into said paramagnetic fluid at sub-ambient temperature by virtue of said temperature reduction.

29. An apparatus for condensing vapor at sub-ambient temperature comprising:
 a quantity of paramagnetic fluid;
 means for isothermally magnetizing said paramagnetic fluid at an initial sub-ambient temperature;
 means for demagnetizing said paramagnetic fluid thereby causing a temperature reduction in said fluid to a temperature below said initial sub-ambient temperature by the resulting magnetocaloric effect;
 means for placing said vapor in thermal contact with said paramagnetic fluid such that said paramagnetic fluid can absorb heat from said vapor by virtue of said temperature reduction thereby condensing said vapor at sub-ambient temperature;

wherein said means for isothermally magnetizing said paramagnetic fluid comprises;
 a current carrying coil means for creating a magnetic field;
 chamber means for initially placing and holding said paramagnetic fluid at said initial sub-ambient temperature in a location some distance away from said current carrying coil means;
 means for releasing said paramagnetic fluid from said chamber means such that said fluid accelerates toward said current carrying coil means by magnetic attractive forces generated by said magnetic field thereby magnetizing said fluid by allowing said fluid to move toward said coil means were said magnetic field is more intense while simultaneously enabling the heat of magnetization to appear as directed kinetic energy of motion; and
 means for converting said kinetic energy of motion into mechanical work by rotating turbine means thereby enabling said paramagnetic fluid to become magnetized while maintaining said initial sub-ambient temperature.

30. An apparatus for creating an artificial heat sink at sub-ambient temperature comprising:
 a current carrying coil means for creating a magnetic field;
 means for discharging said coil means for removing said magnetic field;
 conduit means leading toward said coil means;
 turbine means mounted inside said conduit means;
 a quantity of paramagnetic fluid at an initial sub-ambient temperature;
 means for feeding said paramagnetic fluid at said sub-ambient temperature into said conduit means thereby enabling said paramagnetic fluid to accelerate through said conduit means toward said coil means by magnetic attractive forces thereby magnetizing said fluid by virtue of moving said fluid closer to said coil means where said magnetic field is more intense while simultaneously enabling heat of magnetization to appear in the form of directed kinetic energy of motion of said fluid moving through said conduit means;
 means for converting said directed kinetic energy of said fluid moving through said conduit means into mechanical work by said turbine means thereby converting said heat of magnetization into mechanical work; and
 means for demagnetizing said fluid by removing said magnetic field by said coil discharging means thereby lowering the temperature of said fluid below said initial sub-ambient temperature by the resulting magnetocaloric effect and enabling said fluid to become a heat sink for absorbing heat energy at sub-ambient temperature by virtue of said temperature reduction.

31. An apparatus for creating an artificial heat sink at sub-ambient temperature comprising:
 primary conduit means;
 current carrying means for creating a magnetic field inside said primary conduit means;
 means for discharging said current carrying means for removing said magnetic field;
 turbine means mounted inside said primary conduit means;
 paramagnetic fluid at an initial sub-ambient temperature;
 means for feeding said paramagnetic fluid into said primary conduit means such that said magnetic field accelerates said fluid toward said current carrying means by magnetic attractive forces thereby magnetizing said fluid and such that heat of magnetization appears as directed kinetic energy of said fluid moving through said primary conduit means;

means for converting said kinetic energy into mechanical work by said turbine means; and means for demagnetizing said magnetized paramagnetic fluid by removing said magnetic field by said discharging means thereby lowering the temperature of said paramagnetic fluid below said initial sub-ambient temperature by the resulting magnetocaloric effect and enabling said fluid to become a heat sink for absorbing heat at sub-ambient temperature by virtue of said temperature reduction.

32. An apparatus as set forth in claim 31 wherein said paramagnetic fluid is liquefied oxygen at cryogenic temperature.

33. An apparatus as set forth in claim 31 further comprising generator means coupled to said turbine means for converting said mechanical work generated by said turbine means into electrical energy.

34. An apparatus as set forth in claim 31 wherein said primary conduit means is in thermal contact with said heat absorbing paramagnetic fluid further comprising:

secondary conduit means in thermal contact with said primary conduit means; and means for feeding a non-condensed vapor at sub-ambient temperature into said secondary conduit means thereby liquefying said fluid by extracting heat from said vapor by said paramagnetic fluid by virtue of said temperature reduction.

35. An apparatus as set forth in claim 34 wherein said non-condensed vapor is vapor discharged from a cryogenic engine further comprising means for feeding said liquefied vapor at sub-ambient temperature back into said cryogenic engine thereby enabling said cryogenic engine to operate cyclically.

36. An apparatus as set forth in claim 31 wherein said current carrying means is a superconducting solenoid having a central bore communicating with said primary conduit means.

37. A condensing system generating an artificial heat sink at sub-ambient temperature for condensing vapor discharged from a cryogenic engine comprising:

a closed loop of primary conduit;

a plurality of spaced-apart superconducting solenoids having central bores mounted around said loop of primary conduit such that said primary conduit passes through said bores;

a like plurality of chambers with sealing doors mounted inside said bores communicating with said primary conduit;

means for opening and closing said chamber doors;

charging means for charging alternating superconducting solenoids with electric current;

turbine means mounted inside said primary conduit between said superconducting solenoids;

secondary conduit means in thermal contact with said primary conduit;

means for isothermally magnetizing paramagnetic fluid by introducing said fluid at sub-ambient temperature into the chambers of said charged superconducting solenoids and converting heat of magnetization into mechanical work;

switching circuit means for transferring said current from said charged solenoids into adjacent discharged solenoids thereby demagnetizing said paramagnetic fluid inside the chambers of said charged solenoids and creating a temperature drop in said fluid by the resulting magnetocaloric effect, said temperature drop enabling said fluid to absorb heat at sub-ambient temperature from vapor passing through said secondary conduit means;

means for re-magnetizing said paramagnetic fluid by opening said chamber doors holding said demagnetized fluid thereby allowing said fluid to accelerate out of said chambers through said primary conduit into the magnetic fields of said charged superconducting solenoids by magnetic attractive forces thereby enabling said fluid to become re-magnetized and enabling the heat of magnetization to appear as directed kinetic energy of said fluid flowing through said primary conduit loop;

means for converting said directed kinetic energy into mechanical work by said turbine means thereby enabling said heat of magnetization to be converted into mechanical work so that said re-magnetization is isothermal;

means for feeding said non-condensed vapor discharged from said cryogenic engine into said secondary conduit means thereby liquefying said vapor at sub-ambient temperature by transferring heat energy from said vapor to said paramagnetic fluid by virtue of said drop in temperature;

means for feeding said liquefied vapor back into said cryogenic engine; and control means for repeating said steps of demagnetizing and isothermally re-magnetizing said paramagnetic fluid in a repetitive process thereby creating said heat sink for absorbing heat energy from said vapor on a continuous basis.A condensing system generating an artificial heat sink at sub-ambient temperature for condensing vapor discharged from a cryogenic engine comprising:

a closed loop of primary conduit;

a plurality of spaced-apart superconducting solenoids having central bores mounted around said loop of primary conduit such that said primary conduit passes through said bores;

a like plurality of chambers with sealing doors mounted inside said bores communicating with said primary conduit;

means for opening and closing said chamber doors;

charging means for charging alternating superconducting solenoids with electric current;

turbine means mounted inside said primary conduit between said superconducting solenoids;

secondary conduit means in thermal contact with said primary conduit;

means for isothermally magnetizing paramagnetic fluid by introducing said fluid at sub-ambient temperature into the chambers of said charged superconducting solenoids and converting heat of magnetization into mechanical work;

switching circuit means for transferring said current from said charged solenoids into adjacent discharged solenoids thereby demagnetizing said paramagnetic fluid inside the chambers of said charged solenoids and creating a temperature drop in said fluid by the resulting magnetocaloric effect, said temperature drop enabling said fluid to absorb heat at sub-ambient temperature from vapor passing through said secondary conduit means;

means for re-magnetizing said paramagnetic fluid by opening said chamber doors holding said demagnetized fluid thereby allowing said fluid to accelerate out of said chambers through said primary conduit into the magnetic fields of said charged superconducting solenoids by magnetic attractive forces thereby enabling said fluid to become re-magnetized and enabling the heat of magnetization to appear as directed kinetic energy of said fluid flowing through said primary conduit loop;

means for converting said directed kinetic energy into mechanical work by said turbine means thereby enabling said heat of magnetization to be converted into mechanical work so that said re-magnetization is isothermal;

means for feeding said non-condensed vapor discharged from said cryogenic engine into said secondary conduit means thereby liquefying said vapor at sub-ambient temperature by transferring heat energy from said vapor to said paramagnetic fluid by virtue of said drop in temperature;

means for feeding said liquefied vapor back into said cryogenic engine; and control means for repeating said steps of demagnetizing and isothermally re-magnetizing said paramagnetic fluid in a repetitive process thereby creating said heat sink for absorbing heat energy from said vapor on a continuous basis.

38. An apparatus for reducing the entropy of a hear sink inside a condensing system operating at sub-ambient temperature comprising:

means for containing paramagnetic fluid at sub-ambient temperature inside said condensing system, said fluid constituting said heat sink;

means for magnetizing said paramagnetic fluid inside said condensing system at sub-ambient temperature;

means for converting hear of magnetization into mechanical work thereby reducing the entropy of said heat sink;

said means for magnetizing said paramagnetic fluid comprises: current carrying coil means for generating a magnetic field inside said condensing system; and means for releasing said paramagnetic fluid in the vicinity of said coil means such that magnetic attractive forces generated by said magnetic field pulls said fluid toward said coil means where said magnetic field is more intense thereby enabling said fluid to become magnetized;

said means of converting said heat of magnetization into mechanical work comprises turbine means for converting directed kinetic energy of motion of said fluid moving towards said coil means into mechanical work; and further comprising means for reducing the temperature of said heat sink inside said condensing system comprising means for discharging said current carrying coil means thereby demagnetizing said paramagnetic fluid and creating said reduction in temperature by the magnetocaloric effect.

39. An apparatus as set forth in claim 38 further comprising means for condensing vapor at sub-ambient temperature by transferring heat from said vapor to said paramagnetic fluid by virtue of said temperature reduction.

* * * * *